(12) United States Patent
Ohmi et al.

(10) Patent No.: US 6,704,757 B1
(45) Date of Patent: Mar. 9, 2004

(54) SEMICONDUCTOR ARITHMETIC UNIT

(75) Inventors: Tadahiro Ohmi, 1-17-301
Komegabukuro 2-chome, Aoba-ku,
Sendai-shi, Miyagi-ken (JP), 980-0813;
Tadashi Shibata, 3-16-411 Echujima
1-chome, Koto-ku, Tokyo (JP),
135-0044; Akira Nakada, Tokyo (JP);
Tatsuro Morimoto, Miyagi-ken (JP);
Takahisa Nitta, Tokyo (JP)

(73) Assignees: Tadahiro Ohmi (JP); Tadashi Shibata (JP); UCT Corporation (JP); I&F Inc. (JP)

( * ) Notice: Subject to any disclaimer, the term of this patent is extended or adjusted under 35 U.S.C. 154(b) by 0 days.

(21) Appl. No.: 09/673,516

(22) PCT Filed: Apr. 19, 1999

(86) PCT No.: PCT/JP99/02062
§ 371 (c)(1),
(2), (4) Date: Jan. 2, 2001

(87) PCT Pub. No.: WO99/54840
PCT Pub. Date: Oct. 28, 1999

(30) Foreign Application Priority Data

Apr. 17, 1998 (JP) .......................................... 10-124287

(51) Int. Cl.⁷ .............................. G06J 1/00; G06G 7/00
(52) U.S. Cl. .......................................... 708/3; 708/801
(58) Field of Search ...................... 708/3, 801

(56) References Cited

U.S. PATENT DOCUMENTS 5,187,680 A * 2/1993 Engeler ...................... 708/801
5,822,497 A * 10/1998 Ohmi et al. .................. 709/20
5,864,495 A * 1/1999 Sakashita et al. ........... 708/801
5,917,742 A * 6/1999 Ohmi et al. ................. 708/801

FOREIGN PATENT DOCUMENTS

| JP | 51-25297 | 3/1976 | ............. E02B/3/22 |
| JP | 4-34314 A | 2/1992 | ............. G01D/21/00 |
| JP | 06231285 A | 8/1994 | ............. G06G/7/12 |
| JP | 6-244375 A | 9/1994 | ............. H01L/27/10 |
| JP | 11025200 A | 1/1999 | ............. G06G/7/12 |

OTHER PUBLICATIONS

Form PCT/IPEA/409 Cover Sheet, Box I, Box V, and Box VIII (total of 4 sheets).

* cited by examiner

Primary Examiner—Tan V. Mai
(74) Attorney, Agent, or Firm—Randall J. Knuth

(57) ABSTRACT

A semiconductor arithmetic unit which realizes a maximum or minimum value retrieval operation at high speed and with a high degree of accuracy used in a vector quantization processor is composed of a binary-multivalue-analog merged operation processing circuit. A multi-loop circuit includes an amplifying circuit group composed of a plurality of sets of first amplifiers with a floating gate to which first electrodes and a single second electrode are capacitively coupled with a predetermined ratio, a logical operation circuit to which output signals of the amplifying circuit group are inputted and which outputs a logical 0 or 1, and a second amplifying circuit to which an output signal of the logical operation circuit is inputted and whose output is distributed to all of the second electrodes of the amplifying circuit group. The second amplifying circuit includes an adjusting circuit which adjusts an output current driving ability and a controlling circuit which controls the adjustment with a predetermined regulation. The adjustment of the controlling circuit is executed according to variation of the output of the logical operation circuit.

20 Claims, 19 Drawing Sheets

SEMICONDUCTOR ARITHMETIC UNIT

BACKGROUND OF THE INVENTION

1. Field of the Invention

The present invention relates generally to a semiconductor arithmetic unit and, more particularly, to an integrated circuit system which can perform an arithmetical operation such as image processing using multivalue or analog signals at high speed and with a high degree of accuracy.

2. Description of the Related Arts

A technique of real-time data compression according to transmission capacities of communication lines has been required in order to transmit motion picture data including much amount of information to remote places. As one means of this data compression, there is a technique of vector quantization. After comparing an arbitrary vector having a dimensional number with a plurality of different vectors having the same dimensional number (code book) previously prepared to select the most similar vector from all the vectors, the vector quantization quantizes an original vector on the basis of the pattern number of the selected vector. If the number of vectors in the code book (code vectors) is smaller than any number which the original vector may acquire, data is compressed. Decompression only needs to take out the vector corresponding to the number from the code book. Accordingly, it is widely known that the vector quantization is a data compression algorithm in which decompression can be performed very simply.

Some dedicated digital processors have been developed in order to perform this vector quantization operation in parallel and at high speed. In these dedicated processors, a correlator is generally disposed in parallel which compares a vector to be quantized with a code vector to execute quantification of the both similarities, and the similarities for all of the code vectors are simultaneously calculated in parallel. A distance between vectors is generally used with respect to this similarity, and the smallest distance is assumed to be the largest similarity.

Accordingly, the speed of the vector quantization can be made faster by providing a circuit which simultaneously receives the distance data in parallel from the correlator and retrieves the smallest value in the block. However, all of processing circuits were constituted of digital circuits, so that, as a result, the scale of the hardware essentially became very large. In particular, as the correlator realized by digital circuits required a lot of adders, there was a problem that the correlator occupied the largest scale.

One technique to solve this problem is to introduce analog or multivalue operation with a very simple circuitry into the processing circuits. From such a point of view, a report with respect to a binary-multivalue-analog merged operation processing circuit has been performed which uses a neuron-MOS transistor, a first-time four terminal device. Using this circuit enables the correlator to be constituted of very simple circuits. Distance data with analog and multivalue formats are outputted from such a correlator. There has been used a Winner-Take-All circuit employing a neuron-MOS comparator which can be set threshold values according to the distance data, as an operation circuit to determine a minimum value in these distance data. This enables the operation to find the minimum value in the distance data to be replaced with that of finding a maximum or minimum value of threshold values of the neuron-MOS comparator. The operation of finding a maximum or minimum value of threshold values of the neuron-MOS comparator can be achieved by inputting a common reference voltage to all comparators and by controlling the comparators to invert only the outputs of the comparators having a maximum or minimum threshold value. For this purpose, a ramp scan method has been proposed and the operation thereof has been confirmed (Refer to, for example, Japanese Patent Publication No. Hei 6-244375). This method operates such that the reference voltage is flatly changed over the entire dynamic range, and at the instant a neuron-MOS comparator with the maximum or minimum threshold value inverted, a latch signal is outputted in order to latch the output value of the comparator to a register at that moment. This method is very simple and easy to understand. However, in principle, there is a trade-off relation between the sweep rate of the reference voltage and the retrieval accuracy, and when trying to execute a high speed retrieval, deterioration of the retrieval accuracy is essentially unavoidable. That is, when a high speed sweep is execute, while a maximum value is detected and the latch signal is transmitted to the register, the reference voltage is further changed by a ramp scan, causing a neuron-MOS comparator with another threshold value included in the voltage range corresponding to its change to be inverted. In particular, when the ramp scan method is employed, the retrieval is performed with a monotonic sweep of one reference voltage, so that when attempting to make sure of the retrieval accuracy, a very slow sweep is required in practice over the entire dynamic range, forcing essentially the search time to be prolonged. One method for improving this problem is to make a transmittance delay time of the latch signal short by improving a circuit configuration. However, there is also a limitation in this method.

Furthermore, in a circuit employing a conventional ramp scan method, there was a problem in that a ramp scan signal should be externally inputted. For this problem, a technique of the prior art (Japanese Patent Publication No. WO 96/30855), as shown in FIG. 18, is provided. That is, a semiconductor operation circuit having one or more neuron-MOS transistors with plural input gate electrodes is characterized by having an inverter circuit group including a plurality of inverter circuits composed of the neuron-MOS transistor, having a means which applies a predetermined signal voltage to a first input gate of at least one of the inverter circuits, inputting output signals to a logical operation circuit, the output signals being obtained by causing output signals of all of the inverters included in the inverter circuit group to pass through a predetermined number of stages of inverter circuits, and feeding back an output signal of the logical operation circuit or the output signal obtained by causing the output signal of the logical operation circuit to pass through a predetermined number of stages of the inverter circuits to a second input gate of at least one of the inverter circuits included in the inverter circuit group. This allows a reference voltage to be produced inside of the semiconductor operation circuit. However, as the circuit is formed by a feedback configuration, the reference voltage constantly oscillates with a certain amplitude, therefore, a problem has developed concerning high accuracy analog voltage comparison operation.

Accordingly, the present invention is performed to solve those above described problems, and it is an object of the present invention to provide a semiconductor arithmetic unit realizing a maximum or minimum value retrieval operation at high speed and with a high degree of accuracy used in a vector quantization processor composed of a binary-multivalue-analog merged operation processing circuit. Further, it is another object of the present invention to add a function for retrieving a vector with a distance of necessary order to the unit.

SUMMARY OF THE INVENTION

The present invention is characterized in that, in a multi-loop circuit comprising an amplifying circuit group composed of a plurality of sets of first amplifiers with a floating gate to which at least one first electrode and a single second electrode are capacitively coupled with a predetermined ratio, a logical operation circuit to which output signals of the amplifying circuit group are inputted and which outputs a logical 0 or 1, and a second amplifying circuit to which an output signal of the logical operation circuit is inputted and whose output is distributed to all of the second electrodes of the amplifying circuit group, the second amplifying circuit includes an adjusting circuit which adjusts an output current driving ability and a controlling circuit which controls the adjustment with a predetermined regulation, and the adjustment of the controlling circuit is executed according to variation of the output of the logical operation circuit.

EFFECTS OF THE INVENTION

According to the present invention, a semiconductor arithmetic unit could be realized which achieved a maximum or minimum value retrieval operation at high speed and with a high degree of accuracy used in a vector quantization processor composed of a binary-multivalue-analog merged operation processing circuit. In addition, a function for retrieving a vector with a distance of necessary order could be added to the unit.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
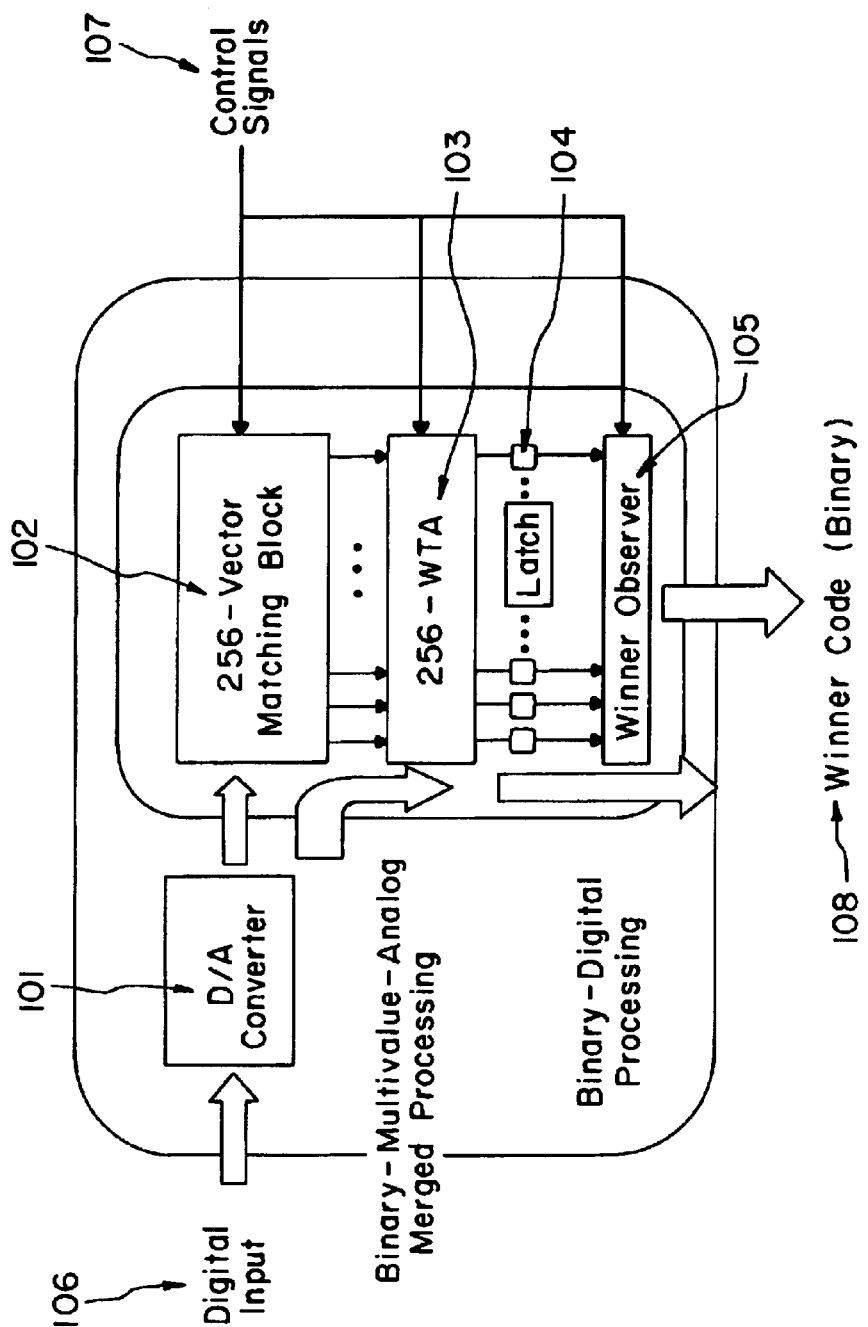
FIG. 1 shows a block diagram of a neuron-MOS analog VQ processor.

| Explanation of codes | |
|---|---|
| 101 | D/A converter |
| 102 | 256-vector matching block |
| 103 | 256-WTA |
| 104 | latch circuits |
| 105 | WO circuit |
| 106 | digital vector input |
| 107 | control signals |
| 108 | code output |
| 201 | input analog vector |
| 202 | input data switching block |
| 203 | Matching Cells |
| 204 | floating gates of the neuron-MOS comparator |
| 205 | the neuron-MOS comparator |
| 206 | line of the neuron-MOS comparator |
| 207 | reference voltage |
| 301, 302 | p-neuron-MOS |
| 303, 304, 305, 306 | switch |
| 307 | terminal for setting the floating gates |
| 308 | output terminal (output load capacity) |
| 309 | input signal |
| 310, 311, 312, 313 | coupling capacitance |
| 314 | power supply voltage terminal |
| 315 | common terminal |
| 316 | reference terminal |
| 317 | the neuron-MOS comparator |
| 318 | switch |
| 319 | pre-charge cycle |
| 320 | comparator active |
| 321 | floating gates of the neuron-MOS comparator |
| 322 | evaluation cycle |
| 323 | comparator reset |
| 401 | reference voltage |
| 402 | time |
| 501 | search time |
| 502 | number of switching step |
| 601 | difference absolute value distances |
| 602 | floating gates of the neuron-MOS comparator |
| 603 | the neuron-MOS comparator |

-continued

Explanation of codes

| | |
|---|---|
| 604 | neuron-MOS comparator row |
| 605 | latch circuit |
| 606 | WO circuit |
| 607 | code output of 8 bits |
| 608 | OR gates |
| 609 | high gain amplifier |
| 610 | controller |
| 611 | variable resistor |
| 612 | input terminal of reference voltage signal |
| 613 | signal of control variable resistor value |
| 614 | reset signal |
| 615 | latch signal |
| 701 | voltage |
| 702 | time |
| 703 | external input signal |
| 704 | input signal of left capacitance C1 |
| 705 | input signal of left capacitance C2 |
| 706 | input signal of right capacitance C1 |
| 707 | input signal of right capacitance C2 |
| 708 | changes of floating gate potentials right p-neuron-MOS |
| 709 | changes of floating gate potentials left p-neuron-MOS |
| 710 | the output of the difference absolute value circuit |
| 801 | the output voltage from the difference absolute value circuit |
| 802 | the input voltage into the difference absolute value circuit |
| 803 | C1 and C2 of the capacitance coupling rate |
| 901 | input |
| 902 | switch |
| 903 | input terminal (input capacitance) |
| 904 | power supply voltage terminal |
| 905 | switch |
| 906 | reference voltage terminal (reference voltage input capacitance) |
| 907 | floating gate |
| 908 | switch |
| 909 | reference voltage signal |
| 910 | CMOS inverter |
| 914 | switch |
| 915, 916, 917 | CMOS inverter |
| 918 | OR gate |
| 919 | comparator reset |
| 920 | comparator active |
| 1001 | input form the OR gate |
| 1002 | input form the high gain amplifier |
| 1003 | controller |
| 1004 | equivalent circuit of five CMOS switches in parallel |
| 1005 | reference voltage signal |
| 1006 | reference signal terminal capacitance of all neuron-MOS comparators |
| 1101, 1102, 1103 | voltage |
| 1104 | time |
| 1105 | WTA reset |
| 1106 | timing of ending search |
| 1107 | output of OR gate |
| 1108 | reference voltage signal |
| 1109 | output of the neuron-MOS comparator with the highest threshold value |
| 1110 | output of the other comparators with the lowest threshold value |
| 1111 | output of leach circuit connected with the neuron-MOS comparator with the highest threshold value |
| 1112 | output of leach circuit connected with the other comparators with the lowest threshold value |
| 1301 | digital VQ processor |
| 1302 | analog VQ processor |
| 1303 | occupied area of pattern matching block |
| 1304 | occupied area of memory |
| 1305 | occupied area of WTA/WO |
| 1501 | voltage |
| 1502 | time |
| 1503 | evaluation cycle |
| 1504 | pre-charge cycle |
| 1505 | WAW reset signal |
| 1506 | control signal of open loop |
| 1507 | reference voltage |
| 1508 | output of OR gate |
| 1509 | leach signal |
| 1601 | power consumption |
| 1602 | operation frequency |
| 1603 | WTA of power consumption |
| 1604 | vector matching block of power consumption |
| 1605 | WO of power consumption |
| 1701 | difference absolute value distances |
| 1702 | floating gates of the neuron-MOS comparator |
| 1703 | the neuron-MOS comparator |
| 1704 | neuron-MOS comparator row |
| 1705, 1706 | latch circuit |
| 1707 | XOR gate |
| 1708 | logic circuit |
| 1709 | high gain amplifier |
| 1710 | controller |
| 1711 | variable resistor |
| 1712 | input terminal of reference voltage signal |
| 1713 | signal of control variable resistor value |
| 1714 | reset signal |
| 1715 | latch signal |
| 1716 | external control signal |

Next, the present invention will be explained in detail with reference to embodiments, but it will be appreciated that the present invention is not limited to the following embodiments.

Embodiment 1

Embodiment 1 is an example in the case when the present invention is applied to a vector quantization processor to perform an actual development. Accordingly, the details of the embodiment as an entire processor will be described, however, it will be appreciated that the present invention is applicable not only to the vector quantization processor, but also to realization of a function for selecting a signal with a predetermined order such as a maximum or minimum value in a plurality of voltage signals.

FIG. 1 shows a block diagram of a neuron-MOS analog VQ (AVQ) processor. Considering the compatibility with a digital VQ processor, the AVQ processor was assumed such that input vectors 106 of 16 elements of digital signals were subjected to D/A conversion in a D/A converter 101 at the previous stage of the processor and inputted to the processor as analog signals. Therefore, when the input vectors are originally in an analog signal format, the D/A converter 101 is not required. Difference absolute value distance between an analog input vector and a code book vector is determined in full parallel mode using an analog multivalue operation in a 256-vector matching block 102. In this matching block, values of 256 code book vectors have been previously written into a circuit by pattern formation in the form of multivalues using a multivalue ROM technique. Next, the operation for picking out the smallest value in the determined distances is executed in a WTA block 103, then the signal of binary logic 1 is caused to be outputted only at the position of the code book vector with the minimum distance and all of the other outputs are made to be 0. The operation result in the WTA block is retained in 256 latch circuits 104, then it is converted into binary code in a WO (Winner-Observer) block 105, and is outputted. A code of the most similar pattern can be obtained through those operations.

Figure 2:
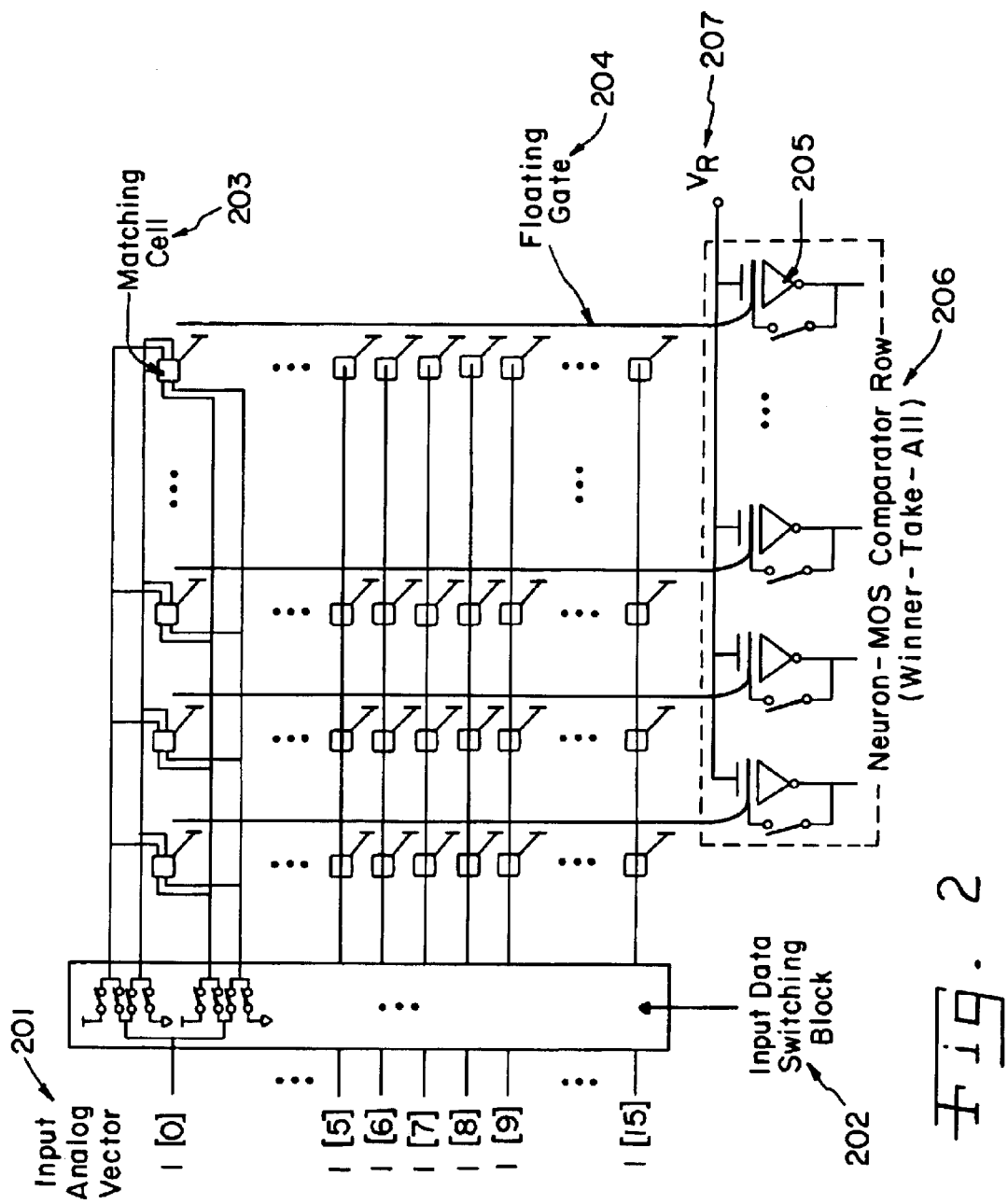
FIG. 2 shows an analog vector matching block.

FIG. 2 shows a configuration of the vector matching block. The matching block forms a structure in which matching cells (difference absolute value circuits) 203 are arranged in a lattice pattern. Each element of an input analog vector 201 is distributed to all of the matching cells 203 in parallel through a switching block 202. A value of an element of a code book vector is previously stored in each matching cell 203, and an absolute value of the difference between each element of the input vector and each element of the code book vector is calculated in the respective matching cell. And, the calculation results are transmitted through capacitive couplings to floating gates 204 of the neuron-MOS comparator, and a sum of outputs from the matching cells of the 16 elements is determined on the floating gates, thereby resulting in a difference absolute value distance.

Figure 3:
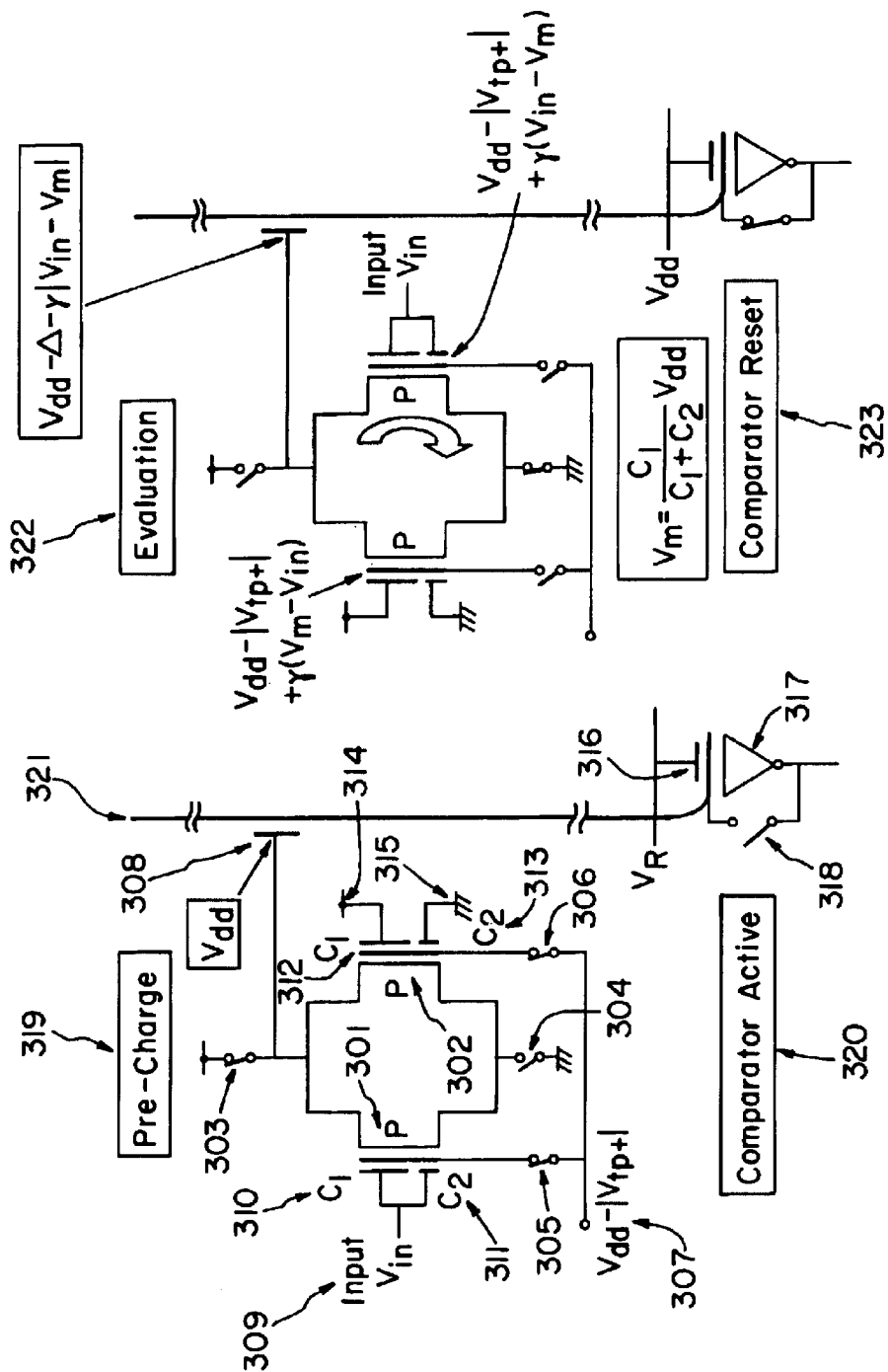
FIG. 3 illustrates an operation of a neuron-MOS source follower-multivalue ROM memory integrated difference absolute value circuit.

As shown in FIG. 3, the matching cell is constituted using a neuron-MOS source follower-multivalue ROM memory integrated difference absolute value circuit in the form in which two p-neuron-MOSs having two input gates and the same specification are connected in parallel, wherein Vin and $V_m$ indicate a signal voltage of one element of the input vector and code book vector, respectively. The value of $V_m$ is stored by capacity division ratio of capacities $C_1$ 310, 312 and $C_2$ 311, 313 coupled to the floating gates of these two neuron-MOSs, and the respective capacity division ratio is previously set up at layout time. This method is resulted from application of a neuron-MOS multivalue ROM memory technique. The stored values can be read out on the floating gates of the neuron-MOSs by supplying power supply voltage $V_{dd}$ (314) and Vss (=0V) (315) to the respective input terminals. The value becomes equivalently equal to that determined when a value calculated by the following expression is inputted to all input capacities.

$$V_m = C_1 V_{dd}/(C_1+C_2) \quad (1)$$

The operation of this difference absolute value circuit is performed in two cycles of a pre-charge cycle 319 and an evaluation cycle 322. In the pre-charge cycle, the respective floating gates are baised to $V_{dd}-|V_{tp+}|$ 307. Here, $V_{tp}+$ is set slightly larger value than the threshold voltage $V_{tp}$ of the p-MOS FET viewed from the floating gate of the p-neuron-MOS. Further, an output terminal 308 is connected to $V_{dd}$ to pre-charge an output load capacity. At this time, as the two p-neuron-MOSs are in ON state, a switch 304 connected to the drain side is made OFF in order to prevent a feedthrough current from flowing. Then, $V_{in}$ is inputted to both input terminals 310, 311 of the left p-neuron-MOS, and at input terminals of the right p-neuron-MOS, $V_{dd}$ 314 is applied to the input capacity $C_1$ 312 and Vss 315 is applied to the input capacity $C_2$ 313 separately. By such operation, $V_{in}$ and $V_m$ are inputted to the left and right p-neuron-MOSs, respectively, and, as a result, charges corresponding to these voltage values are accumulated in the respective floating gates of the right and left p-neuron-MOSs.

Next, in the evaluation cycle 322, after cutting off the floating gate from $V_{dd}-|V_{tp+}|$ 307, biases of the input terminals of the p-neuron-MOSs are reversed from side to side. As a result, voltages FFL and FFR of the floating gates of the left and right p-neuron-MOSs, respectively, are denoted by the following expressions.

$$FFL = V_{dd} - |V_{tp+}| + \gamma(V_m - V_{in})$$

$$FFR = V_{dd} - |V_{tp+}| + \gamma(V_{in} - V_m)$$

$$\gamma = (C_1+C_2)/(C_1+C_2+C_0) \quad (2)$$

wherein $C_0$ indicates all capacities coupled to the floating gates except input capacities such as a gate capacity and parasitic capacity. In this condition, turning OFF the switch of the source side and turning ON the switch 304 of the drain side, the two p-neuron-MOSs are caused to perform in the form of source follower operation. This will cause the charges accumulated in the output load to discharge until the output voltage becomes the same voltage as the value obtained by adding the threshold voltage $|V_{tp}|$ to the lower voltage value in the floating gate voltage of the right and left p-neuron-MOSs. The value at which the output voltage $V_{out}$ may finally arrive is denoted by the following expressions, thereby, the voltage corresponding to the difference absolute value of the two input $V_{in}$ and $V_m$ can be taken out to the output terminal.

$$V_{out} = V_{dd} - \Delta - \gamma|V_{in} - V_m|$$

$$\Delta = |V_{tp+}| - V_{tp}| \quad (3)$$

As shown in FIG. 2, except for 16 outputs from the matching cells another gate for inputting a reference voltage signal is capacitively coupled to the floating gate of one neuron-MOS comparator. A capacity value of this gate has been set up so as to be equal to the sum of all the capacities connected to the matching cells. Here, it will be appreciated that this capacity ratio can be set up to an appropriate value according the design specification at that time. While the difference absolute value distance is being outputted (evaluation cycle time), the floating gates of the neuron-MOS comparators are short-circuited to the output terminals thereof. At this point, input terminals of the reference voltage signal are biased to $V_{dd}$. Therefore, the information of the difference absolute value distances expressing the degree of matching are accumulated to the floating gates of the neuron-MOS comparators as charges, allowing the pipeline processing of the difference absolute value distance operating process and the WTA process to realize.

When the short-circuits of the neuron-MOS comparators are canceled and the inputs from all matching cells are switched to $V_{dd}$ (pre-charge cycle time), the threshold values viewed from the reference voltage signal input terminal side would be set up to the values corresponding to the difference absolute value distances. In other words, the threshold values of the respective neuron-MOS comparators would be decided by the degree of the matching. In the specification of the present embodiment, the larger the difference absolute value distance, the lower the threshold value thereof. Accordingly, in the WTA processing, by selecting the largest threshold value of the comparators, the minimum value of the difference absolute value distance can be retrieved.

Figure 4:
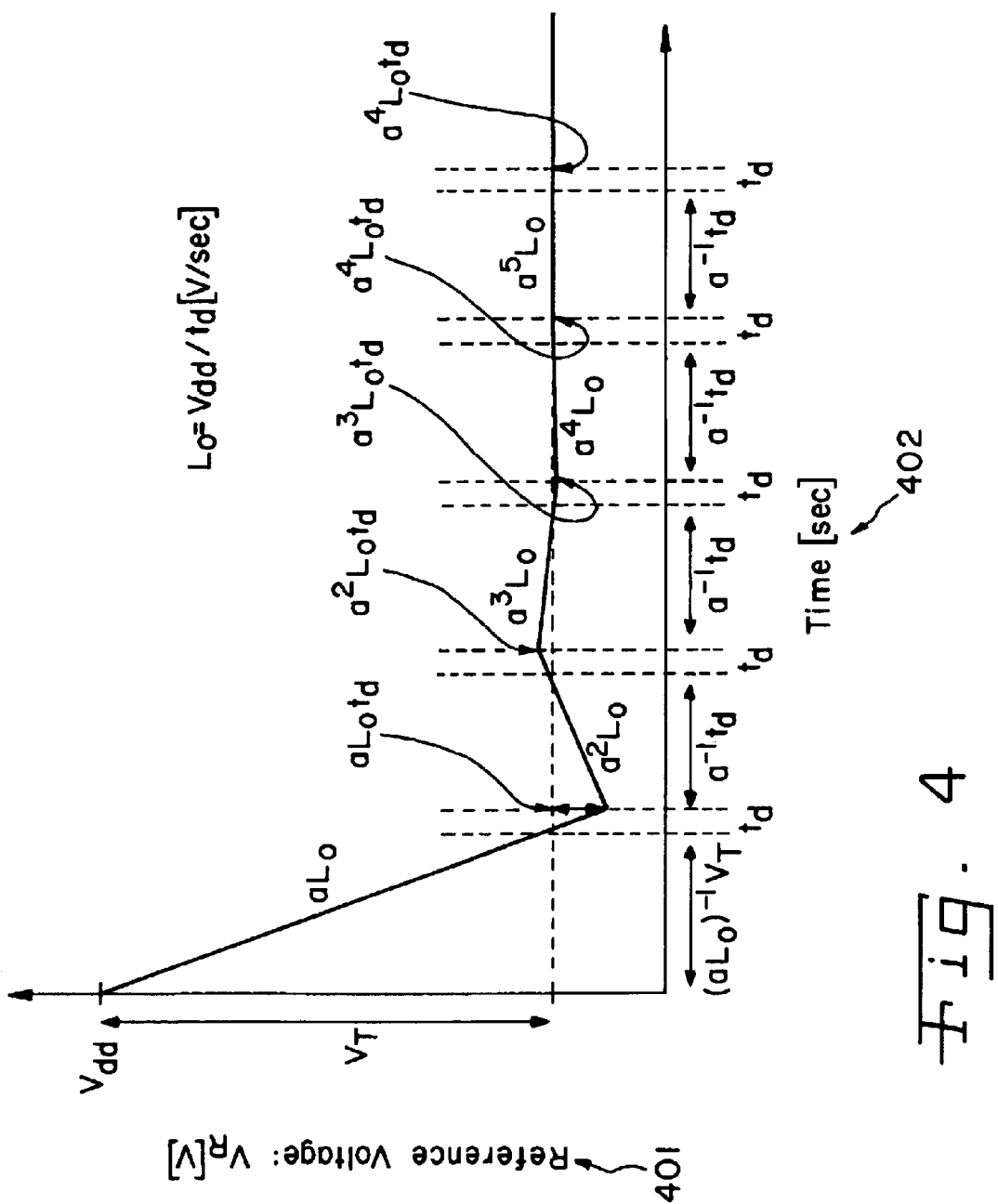
FIG. 4 illustrates a reference voltage self-converging method.

FIG. 4 represents one embodiment of a reference voltage self-converging method which changes a reference voltage in the multi-step manner. The method inverts the sweep direction of the reference voltage signal each time the maximum value is detected, and at the same time, lowers its velocity for each sweep by a factor of "a" times, thereby causing the reference voltage to gradually converge in the vicinity of the maximum value of the threshold values of the neuron-MOS comparators. Here, "a" is a following positive constant. In this figure, $L_0$ (V/second) is a value defined by the Expression 4, and represents a sweep speed when the reference voltage is changed to the power supply voltage $V_{dd}$ during delay time td.

$$L_0 = V_{dd}/t_d \qquad (4)$$

The sweep of a first stage was performed with a sweep speed $aL_0$. This is because, when the sweep speed exceeds $L_0$, the reference voltage signal would be scaled out to $V_{dd}$ or $V_{ss}$ before the maximum value is detected, so that a meaningless sweep may be executed. Therefore, the first sweep is intended to be surely performed with the sweep speed less than $L_0$. Assuming a number of sweeps to be "n", from FIG. 4, time T (second) required to change the reference voltage to the final stage is determined as in Expression 5.

$$T = V_T/(aL_0) + t_d + (n-1)(a^{-1}t_d + t_d) \qquad (5)$$

Here, $V_T$ (V) indicates a voltage amplitude from the power supply voltage $V_{dd}$ to the maximum threshold value voltage of the neuron-MOS comparators to be retrieved.

In the retrieval of the final stage, the reference signal is required to be changed with the sweep speed less than $L_f$ (V/second) determined by Expression 6.

$$L_f = \Delta V/t_d \qquad (6)$$

Here, $\Delta V(V)$ denotes a retrieval accuracy required, and $t_d$ (second) shows a delay time necessary for a feedback signal to propagate through the circuit. Assuming that the sweep speed $anL_0$ in the final stage is equal to this $L_f$, the relationship of Expression 7 will be derived from Expression 4.

$$a = (\Delta V/V_{dd})^{1/n} \qquad (7)$$

When substituting Expressions 4 and 7 into Expression 5 and arranging it, the relationship of Expression 8 will be obtained.

$$T = t_d(((n-1) + V_T/V_{dd})(V_{dd}/\Delta V)^{1/n} + n) \qquad (8)$$

From this result, according to the method, it will be understood that the search time T increases in proportion to the feedback delay time $t_d$.

In addition, the larger the value $V_T$, the longer the search time T. That is, it will be understood that, when a distance is larger, a longer search time may be needed. Further, when n=1, Expression 8 is denoted by Expression 9.

$$T = (V_T + \Delta V)/L_f \qquad (9)$$

This expression is obtained by adding the accuracy $\Delta V$ to the amplitude $V_T$ indicating the voltage to be retrieved in the WTA processing and dividing the resultant value by the final sweep speed $L_f$, so that the expression can be understood to be equivalent to the search time in the ramp scan method.

Figure 5:
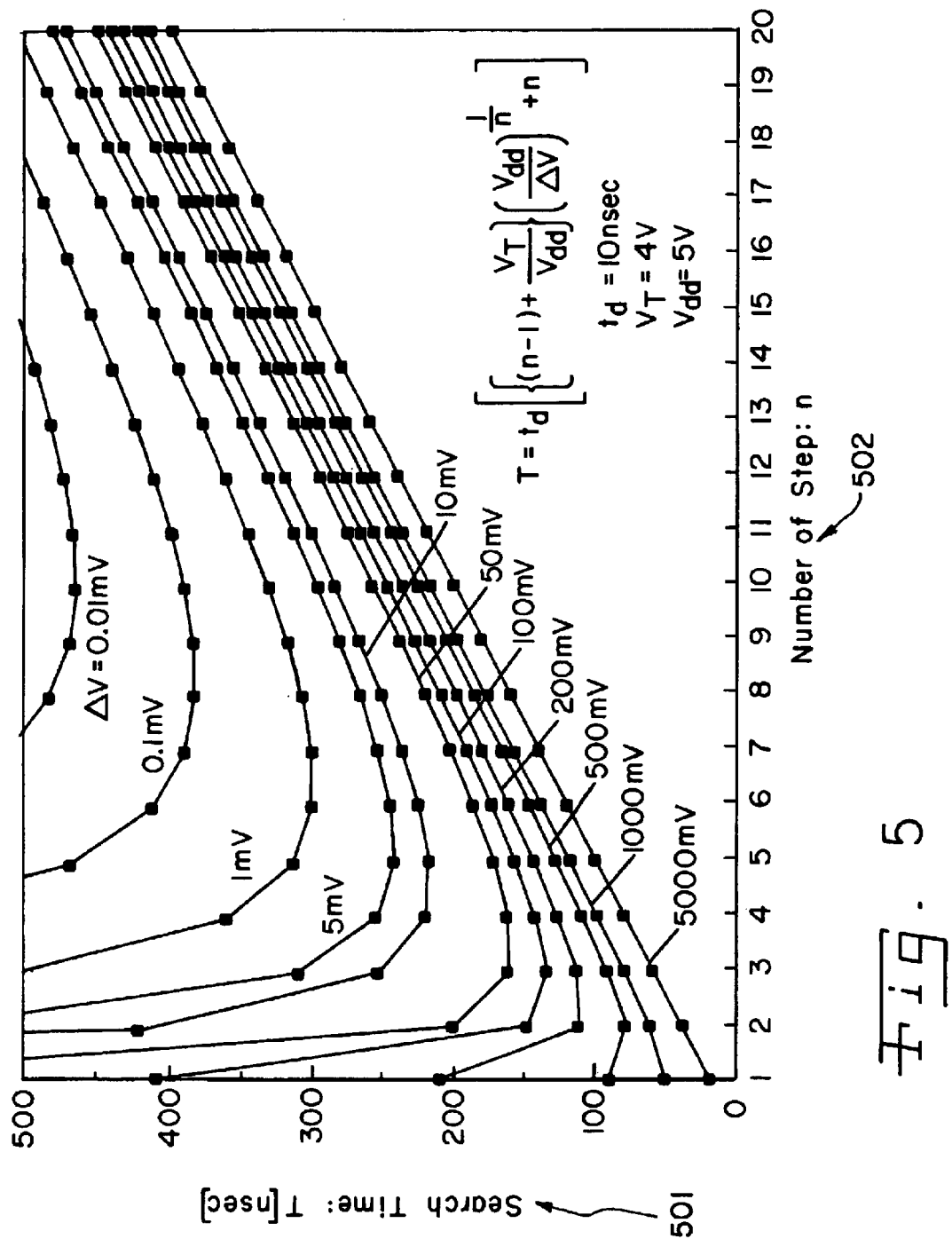
FIG. 5 shows a relationship between a number of sweeps and search times obtained from Expression 8.

It is necessary that value n should be defined so that the search time T is made minimum. FIG. 5 shows a diagram in which search time T is plotted with respect to the sweep times n when the value $\Delta V$ is changed to several values. This calculation used $V_{dd}$=5V, td=10 nanoseconds, $V_T$=4V, as typical parameters. It can be understood that value n exists in which search time T becomes minimum with respect to each $\Delta V$ and the larger value n the smaller $\Delta V$. It is appreciated that, when $\Delta V$ is below 500 mV, the search time can be made overwhelmingly short according to the reference voltage self-converging method as compared with that of the ramp scan method of n=1. Further, the minimum value of the respective search times T becomes larger the smaller $\Delta V$. That is, this means that, when performing a retrieval of higher precision, the longer search time is required. From these results, the reference voltage self-converging method proposed in the present invention can be summarized as an effective technique when a retrieval of high precision is performed at high speed.

Figure 6:
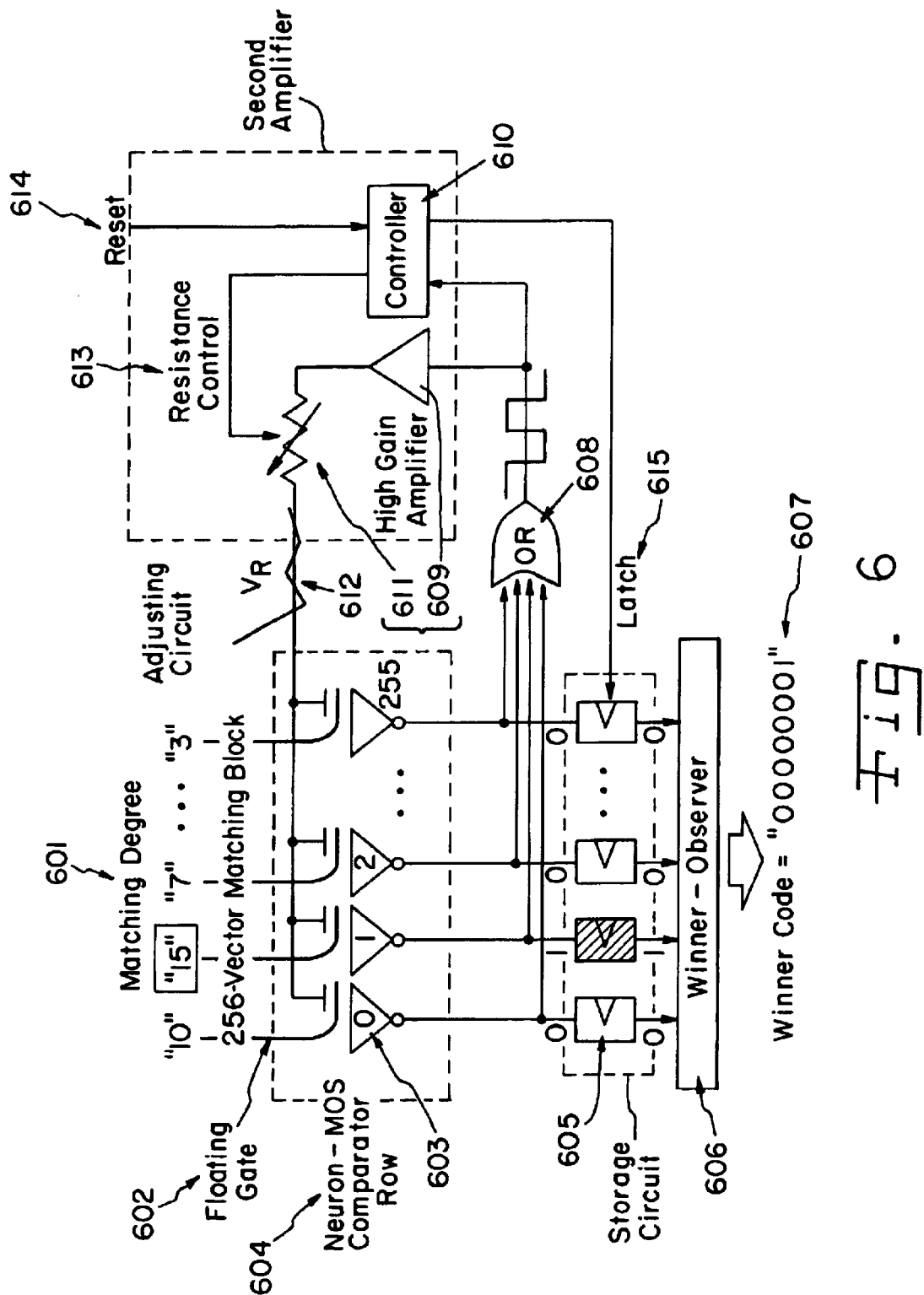
FIG. 6 shows a reference voltage self-converging Winner-Take-All circuit.

The WTA circuit with the reference voltage self-converging method is realized by an oscillation type neuron-MOS WTA, as shown in FIG. 6. This figure indicates the operation of the WTA using a simple block diagram when the matching block is in the pre-charge cycle. 256 neuron-MOS comparators 603 are provided in parallel, and difference absolute value distances 601 are accumulated on respective floating gates 602 as charges, as described above. Outputs of the 256 comparators are collected to an OR gate 608. Further, An output of the OR gate 608 is fed back to reference voltage signal input terminals 612 of all comparators through a high gain amplifier 609 and a variable resistor 611 controlled by a controller 610. Therefore, these components forms a 256 multi-loop neuron-MOS ring oscillator, so that, if these components are operated as they are, a reference voltage VR 612 may oscillate with a certain voltage amplitude.

The discrimination accuracy of a maximum value and other values of the threshold values are determined by rising and falling sweep speeds of the VR waveform oscillated by the ring oscillator and by a loop delay time. The sweep speed is dependent on electric current driving ability by which the high gain amplifier drives input capacities of all the neuron-MOS comparators through the variable resistor. As VR is controlled so as to be self-converged, the sweep speed was controlled by dynamically switching value of the variable resistor to change the electric current driving ability.

Firstly, a value of the variable resistor is set up to the smallest value. Accordingly, the reference voltage input capacities of the neuron-MOS comparators which have been charged up to $V_{dd}$ in the evaluation cycle of the matching block are rapidly discharged, so that VR is varied greatly. That is, this means that a high speed and rough retrieval is executed. When VR passes through the maximum threshold value of a neuron-MOS comparator, the neuron-MOS comparator is inverted and its signal is again fed back to the input gates of the neuron-MOS comparators through the OR gate, the high gain amplifier, and the variable resistor. However, VR has already overreached the maximum threshold value voltage because of the delay time associated with the transmission. Then, the controller switches the value of the variable resistor to a larger one according to the feedback of the signal, and in turn, the input gates are charged with a slower sweep speed. This causes the amount of VR variation to be more gentle, allowing a retrieval of higher precision to be executed. Subsequently, by performing the similar operations repeatedly and increasing the values of the variable resistor, the sweep speeds of VR are reduced in order, the overreached amount of VR is lowered, and the retrieval accuracy is increased gradually. At the final phase, the value of the variable resistor is set up to the largest one, and a retrieval of the highest precision will be executed in which VR is varied very slowly. The sweep speed of VR is controlled in this manner and, finally, only the comparator with the minimum distance information is forced to oscillate. A position having the minimum distance is taken in a latch circuit 605 as a binary signal at the stage the position is decided, and encoded the position by a WO circuit 606 to obtain a code 607 of 8 bits.

In a conventional neuron-MOS WTA circuit, input of a ramp signal from outside WTA was required to retrieve the minimum value. However, a reference voltage signal used in a neuron-MOS comparator can be produced automatically in this method of the present embodiment. Therefore, the method may be a circuit with an autonomous control function.

In addition, an OR gate is used in the present embodiment, however, it will be appreciated that, when an AND gate is used in this position, only a comparator having a maximum distance can be oscillated with the same configuration except the AND gate.

In this WTA circuit, a reference voltage in each of the sweep stages varies exponentially according to the RC time constant determined by the value of the variable resistor at that time and all of the load capacities of the reference voltage signal, and its speed differs depending on the value of the reference voltage at the start of the sweep. Therefore, in this circuit, it is impossible to realize the entirely same operation as the reference voltage control of FIG. 4. However, it is possible to spuriously realize the operation to attempt a speeding up of the retrieve. The present embodiment assumed that all of the time changes of the reference voltage linearly change with the sweep speed determined by the RC time constant, in order to simplify the problem, and realized the reference voltage self-converging method. The sweep speed due to this RC time constant was defined by a value obtained by dividing the power supply voltage $V_{dd}$ by the RC time constant, at that time. In order to make equal the final sweep speed due to the RC time constant to $L_f$ of Expression 6, a value Rf ($\Omega$) of the final variable resistor is defined as Expression 10.

$$R_f = V_{dd}/C_{vr}L_f \quad (10)$$

Here, $C_{vr}$ (F) is a value of all the load capacities of reference voltage signal lines extracted from the circuit. Further, in view of the circuit delay, value n was defined in which the search speed became minimum according to FIG. 5, and value $R_i$ of the variable resistor in the i-th sweep stage other than "n" was set up as the following Expression 11 according to value a of Expression 7.

$$R_i = (\Delta V/V_{dd})^{(n-1/n)} R_f \quad (11)$$

In the method of the present embodiment, however, as the search voltage is a maximum value and the sweep of the reference voltage is started from the power supply voltage, the value n must be an odd number.

The neuron-MOS AVQ processor was prototyped by the Motorola 1.5 micrometers CMOS two-layered polysilicon two-layered metal process using the prototype service of University of Tokyo Large Scale Integrated Circuit Design Education Center (VDEC).

Figure 7:
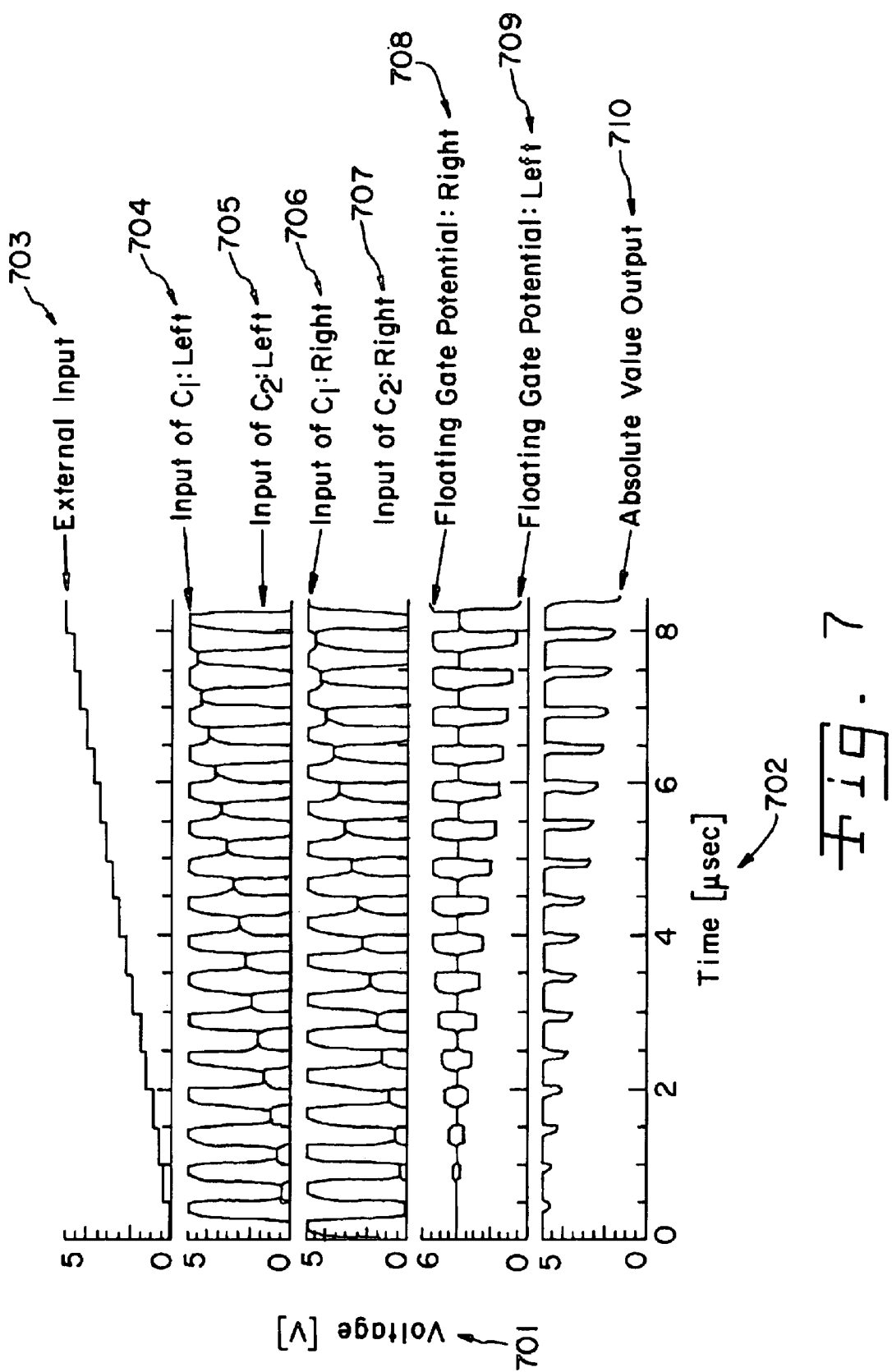
FIG. 7 shows HSICE simulation waveforms of the difference absolute value circuits when logic 0 is stored to the neuron-MOS multivalue memories.

The AVQ processor produced this time constituted $C_1$ and $C_2$ of the difference absolute value circuit by unit of capacities of total of 16, and stored the values $V_m$ represented by a multivalue of 17 values to the neuron-MOS multivalue ROM memory with its ratio appropriately changed. FIG. 7 shows a result of observing the operations of the difference absolute value circuits stored 0 as a level of $V_m$ with the HSPICE simulation. Here, the result was obtained using device parameters of LEVEL=28 MOS FETs extracted from the Motorola 1.5 micrometers CMOS process due to the VDEC prototype service. The p-neuron-MOS operating as a source follower adopted a minimum design rule of W/L=3 micrometers/1.5 micrometers. Further, $C_1$ and $C_2$ were constituted with capacities of 16 fF per one unit, and the capacities were set up with a ratio of $C_1$: $C_2$=0:16 in order to represent 0 level in this simulation. The power supply voltage $V_{dd}$ was set to 5V and $|V_{tp+}|$ was set to 1V, and charge of the floating gates was performed with 4V. The switching block (FIG. 2) changing the external input signal so as to correspond to each of the pre-charge and evaluation cycles was also constructed on the simulation, and the outputs thereof were inputted to the difference absolute value circuit to observe the operation of the difference absolute value circuit. Additionally, the simulation was performed in consideration of parasitic capacities such as wiring capacities and substrate capacities obtained from the result of layout in order to reproduce the actual state of the pre-production chip as accurately as possible.

A waveform of a first stage in FIG. 7 is an external input signal 703, and a multivalue voltage of 17 values with a dynamic range of 5V is inputted for each 500 nanoseconds cycle from 0 level to 16 level. Waveforms of second and third stages (704, 705, 706, and 707) are signal waveforms outputted from the switching block and inputted to $C_1$ and $C_2$ of the right and left input gates of the difference absolute value circuits, respectively. The difference absolute value operation is performed by switching one external input signal to right and left alternately in this manner. Waveforms of a fourth stage represent changes of floating gate potentials (708, 709) of the right and left p-neuron-MOSs of the differential absolute value circuits. As the storage level is 0 in the condition of this embodiment, the floating gate potentials are changed by values corresponding to respective input levels such that the left floating gate potential is changed toward the negative direction and the right toward the positive direction from the starting point of 4V in the evaluation cycle. There is an upper limit in increase of the right potential, because the right potential reaches the ON voltage by applying a forward bias to source drain pn junctions in the circuit. The last waveform shows the result of observing the output 710 of the difference absolute value circuit. The source follower operation is performed after the floating gate voltages become stable, thereby discharging the charges accumulated in the output load capacities. It will be understood that all of the discharges are performed corresponding to the floating gate potentials of the left p-neuron-MOSs in this result.

Figure 8:
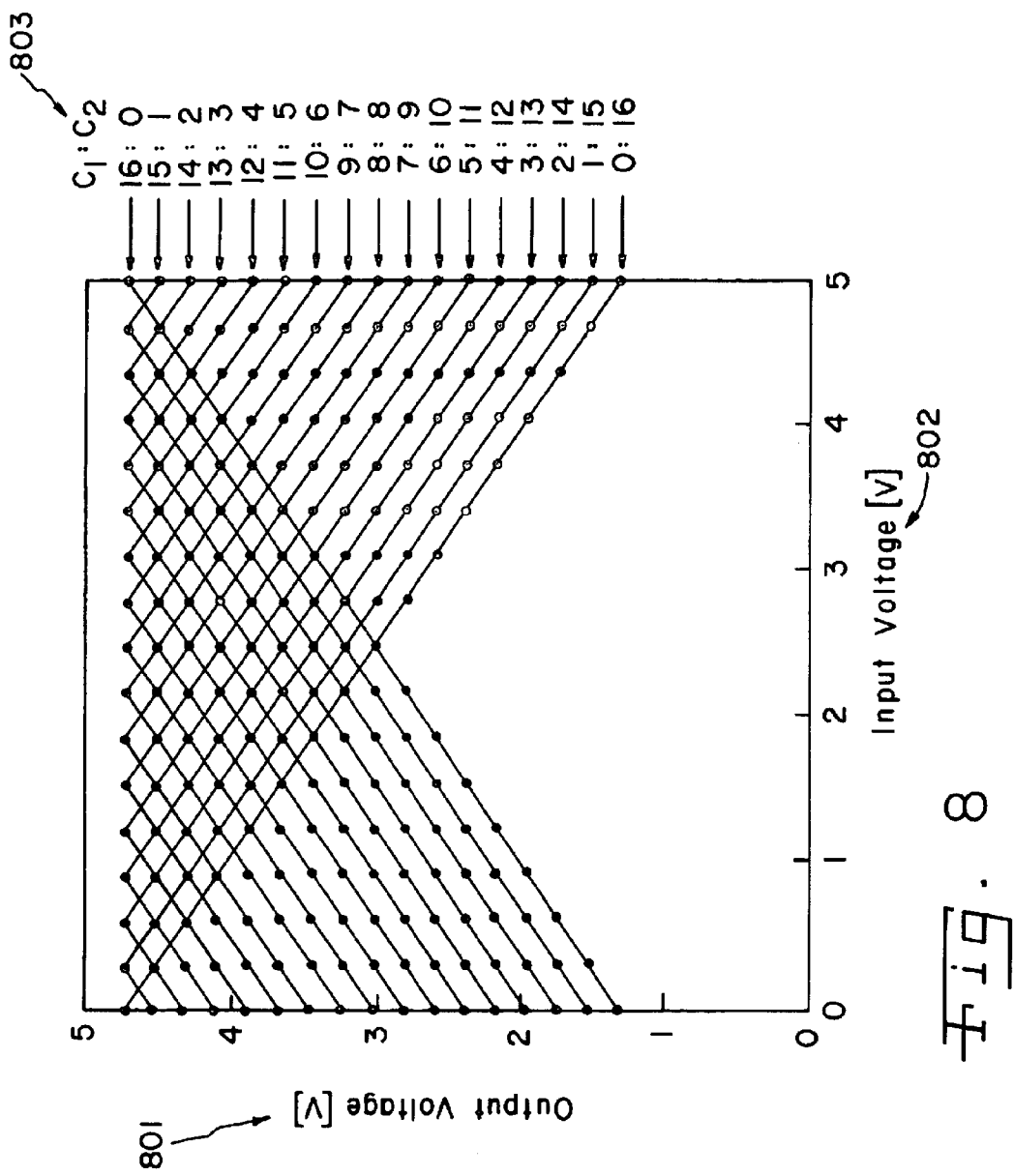
FIG. 8 shows input-output characteristics of all of the neuron-MOS source follower-multivalue ROM memory integrated difference absolute value circuits which store 17 values obtained from the HSPICE simulation.

Difference absolute value circuits with the multivalue ROM configuration of all 17 levels are constituted by the same method as that shown in FIG. 7, and output properties with respect to the external input signals thereof are obtained using a simulation. FIG. 8 shows a result of the simulation. The dynamic range of the outputs was 3.4V from 1.32V to 4.72V, and its ratio to the power supply voltage of 5V was 0.68. A substantially linear property over the entire range of the input levels can be obtained. 16 dimensional 256 code books produced for images were previously stored at layout time using the Kohonen's self-organization map using these difference absolute value circuits in the AVQ processor of the present embodiment.

The reason why p-neuron-MOSs were used as MOS FETs performing source follower operation in this embodiment was that the production process of chips used was the single n well CMOS process. That is, only p-neuron-MOS could be used as a neuron-MOS subjected to source follower operation for eliminating variation of the threshold values due to the bias effect by short-circuiting a MOS FET substrate to source electrodes and controlling their potentials separately. Accordingly, if manufacturing process may permit, the difference absolute value circuits can be constituted with the similar method using n-neuron MOSs.

Figure 9:
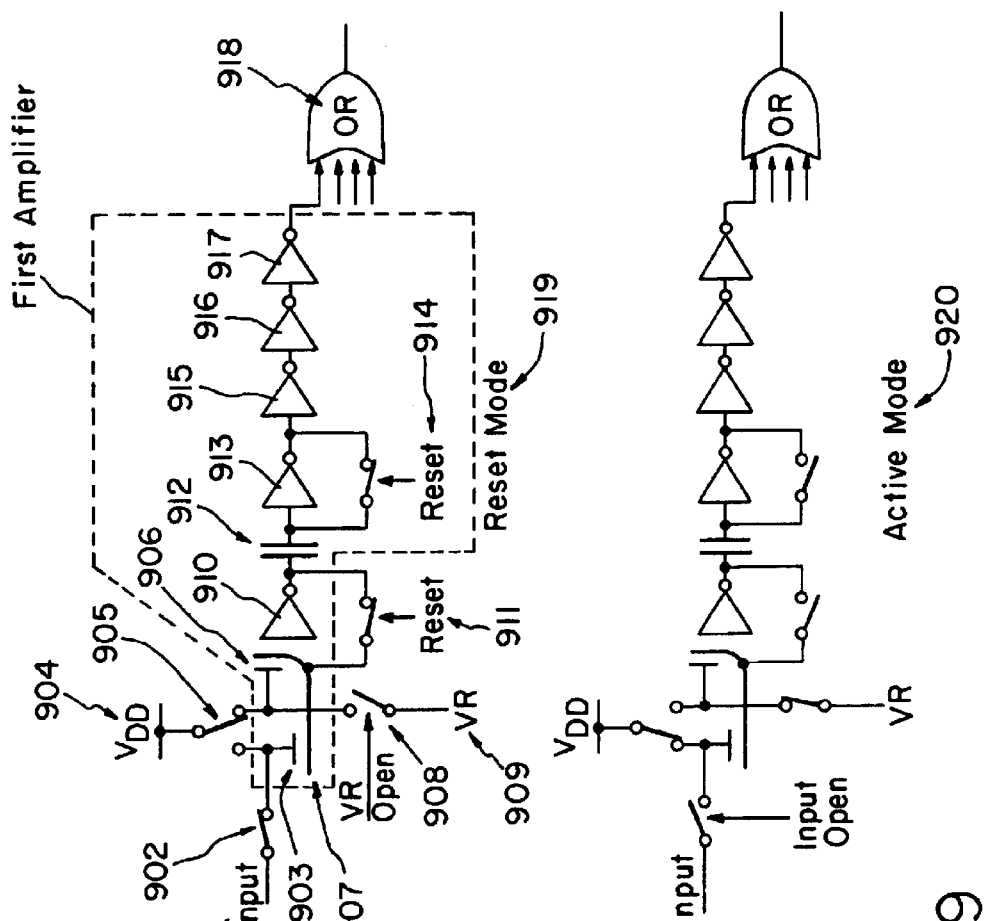
FIG. 9 shows a configuration of a neuron-MOS comparator.
Figure 10A:
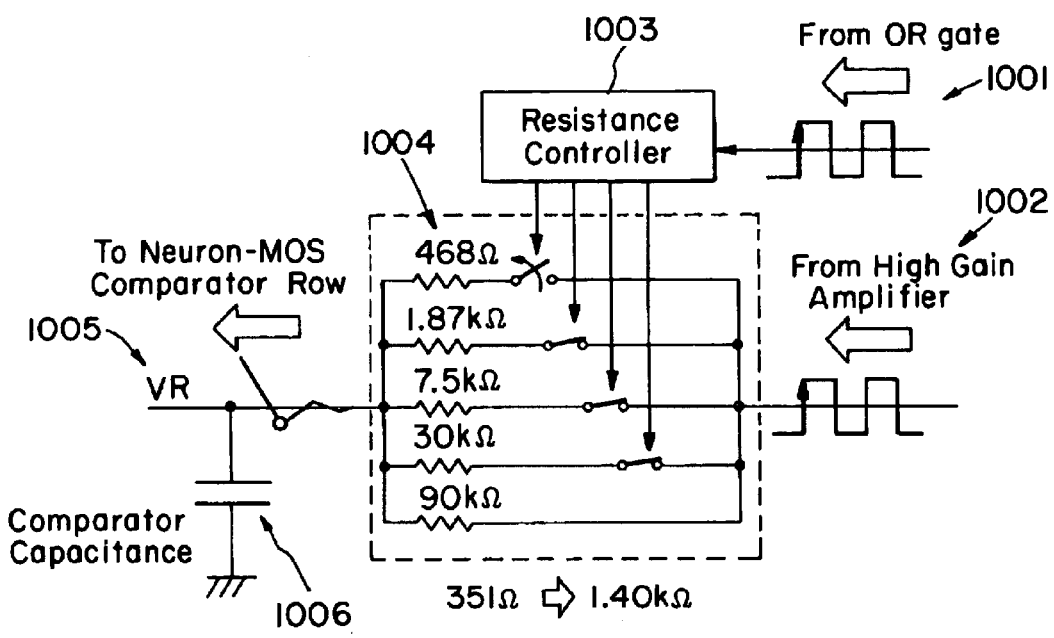
FIG. 10 shows an equivalent circuit of a variable resistor and its operation sequence, and (*a*) switching operation from first to second sweep, (*b*) switching operation from second to third sweep, (*c*) switching operation from third to fourth sweep, and (*d*) switching operation from fourth to fifth sweep.
Figure 10B:
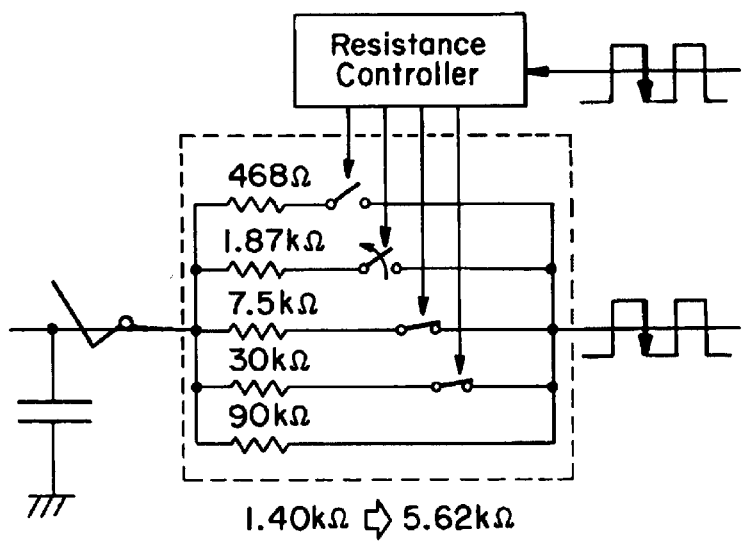
Figure 10C:
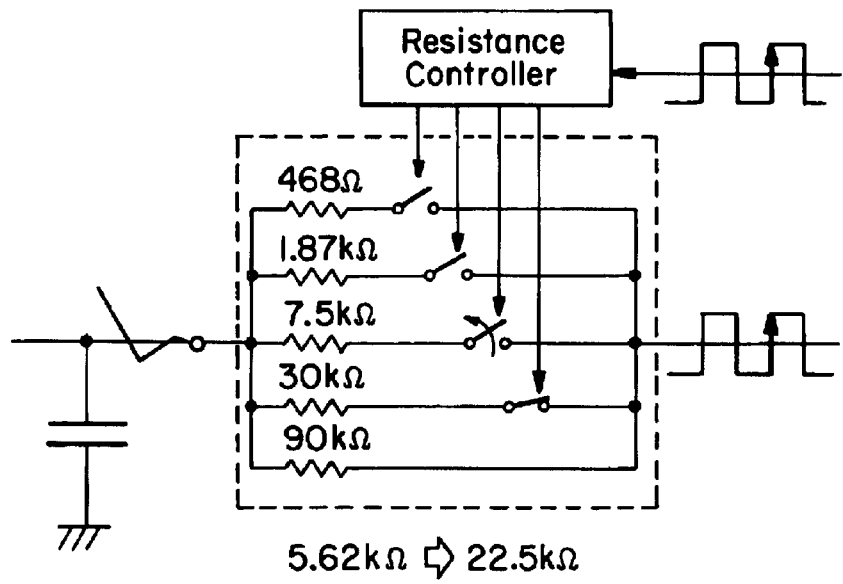
Figure 10D:
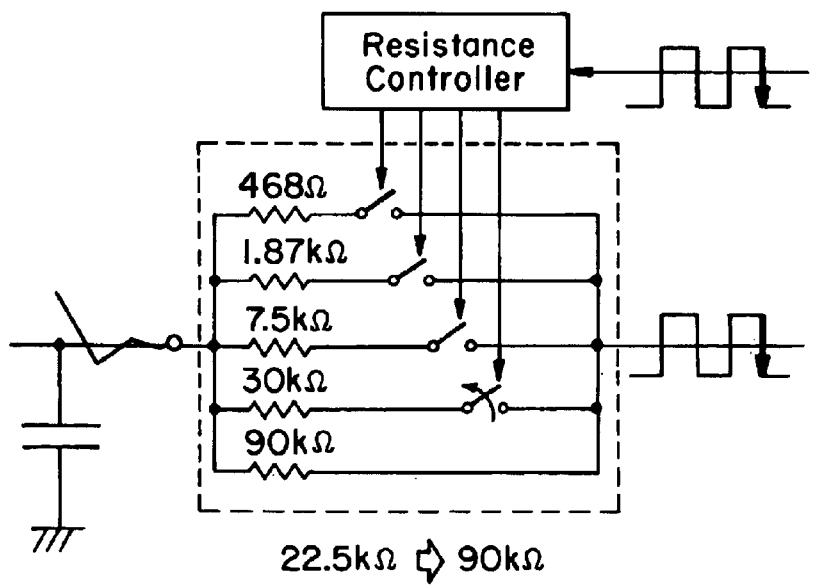

FIG. 9 shows a configuration of the neuron-MOS comparator. The neuron-MOS comparator employs an inverter structure with five stages in order to realize a high gain. The first stage is a neuron-MOS inverter in which a plurality of inputs are connected to a CMOS inverter 910 by the capacitive coupling. All of the remainders are usual CMOS inverters 913, 915, 916, and 917, and only in the second stage, its input is connected to the output of the first stage neuron-MOS inverter through a capacitive coupling. The floating gate of the neuron-MOS inverter is capacitively coupled to each of 16 inputs (in this figure, one input is shown for simplicity) from the matching cell and a reference signal input with a ratio of 1 to 1. In reset time, while the reference signal input is biased to $V_{dd}$, a difference absolute value distance is inputted from the matching cell, and the inputs and outputs of the first and second inverters are short-circuited sequentially. This allows the difference absolute value distance to be accumulated in the floating gate of the neuron-MOS inverter as charges, thereby the threshold value of the neuron-MOS comparator is set up to the voltage corresponding to the distance. In WTA operation time, the input from the matching cell is led to $V_{dd}$, and the retrieval is performed using the reference voltage signal.

In the AVQ processor of this embodiment, it was decided that the search accuracy in the WTA operation was set up to 5 mV and the number of sweeps was five stages using FIG. 6. In addition to this, the values of the variable resistor in each cycle were decided. FIG. 10 shows an equivalent circuit of the variable resistor and its switching sequence for realizing the resistor values determined in this way. The whole of the resistor values of the variable resistor were realized by using five CMOS switches in parallel, setting their ON resistors by appropriately adjusting W/L ratio of the respective MOS FETs, and turning ON and OFF the resistors. Observing the output of the OR gate of WTA, the controller detected its rising and falling edges, so that the control of the switches was performed in synchronization with the timing, as shown in FIG. 10.

Figure 11:
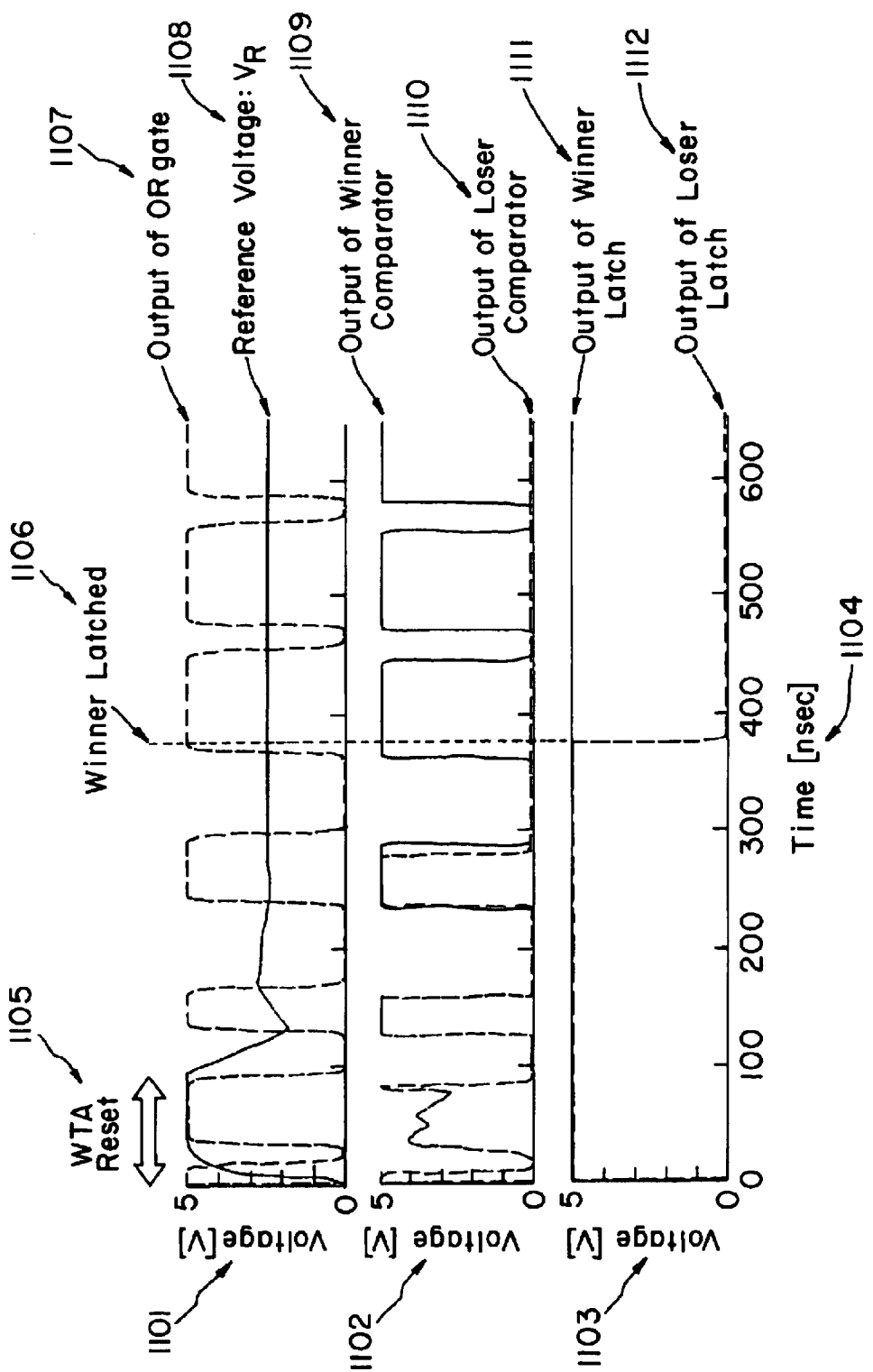
FIG. 11 shows operating waveforms of the reference voltage self-converging WTA circuit according to the HSPICE simulation.

FIG. 11 shows the result of observing the operation of the reference voltage self-converging WTA circuit constituted in this manner using the HSPICE simulation. In this simulation, the reset cycle of the comparators was performed by inputting 2.5V to all the input terminals from the matching block of one comparator in 256 neuron-MOS comparators and inputting a lower voltage by 10 mV than 2.5V to the input terminals of the other comparators. Waveforms 1107, 1108 of the first stage show the result of observing the output from the OR gate gathering together the outputs from the comparators and the reference voltage. Waveforms 1109, 1110 of the second stage are the outputs of the neuron-MOS comparator with the highest threshold value (winner) and the other comparators (loser). Waveforms 1111, 1112 of the third stage are the outputs of the latch circuits. The appearance can be observed in which the reference signal is settling into the target value of 2.5V according to five sweeps as if it self-converges on the target value. Further, based on this, oscillation of the output of the loser is stopped in the middle, and finally, only the output of the winner repeats oscillation. As will be apparent from the figure, the selection result of the winners and losers is retained by taking the outputs of all of the neuron-MOS comparators in the latch circuits after the five sweeps have been finished. Additionally, the delay time td was approximately 10 nanoseconds and the maximum value search time was approximately 280 nanoseconds in this simulation. Although they are somewhat late when compared to the values shown in FIG. 6, it takes approximately 5 microseconds based on Expression 9 when the similar operations are realized using the ramp scan method, so that it was understood that, in this conditions, the improvement of speed of substantially 18 times was realized in comparison to the ramp scan method.

Figure 12:
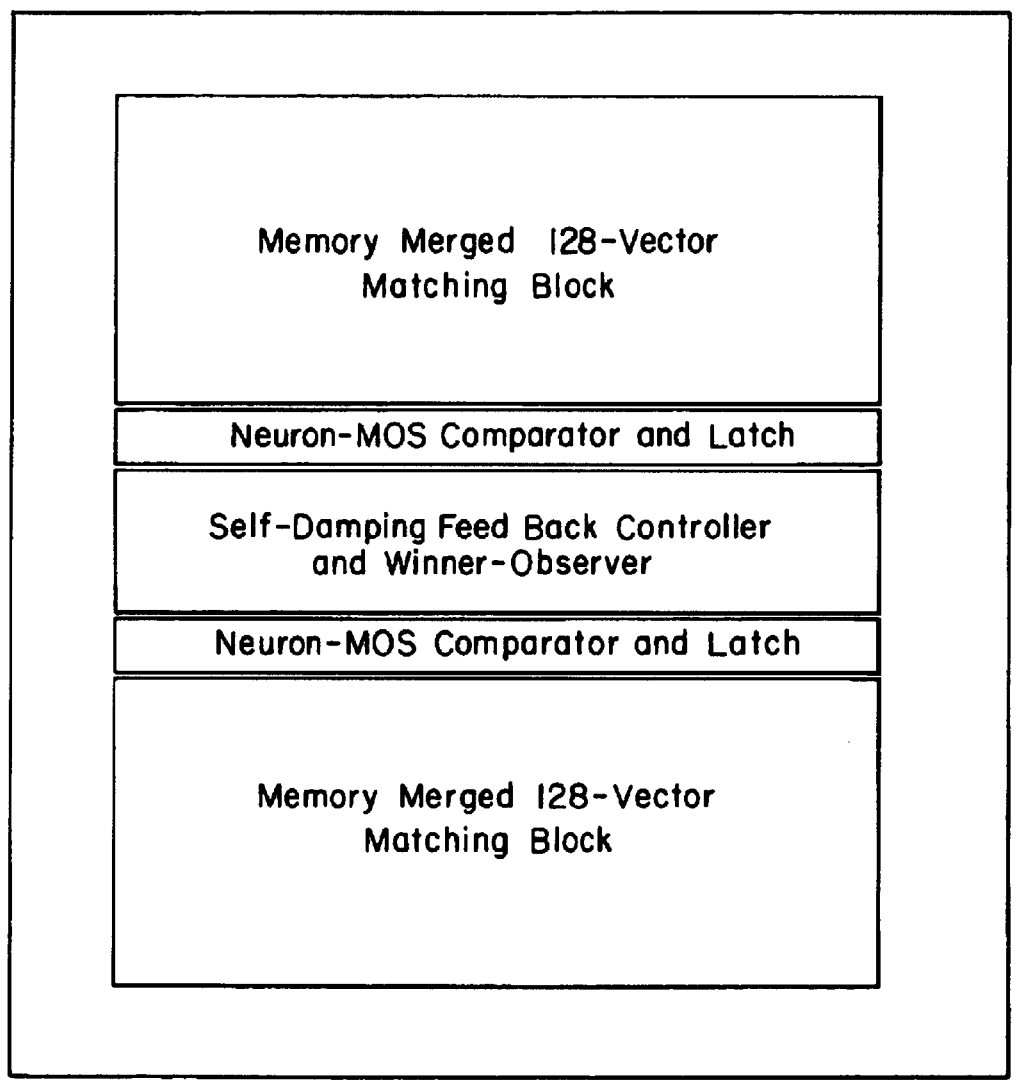
FIG. 12 shows a photograph of a prototype of an analog VQ chip.
Figure 13:
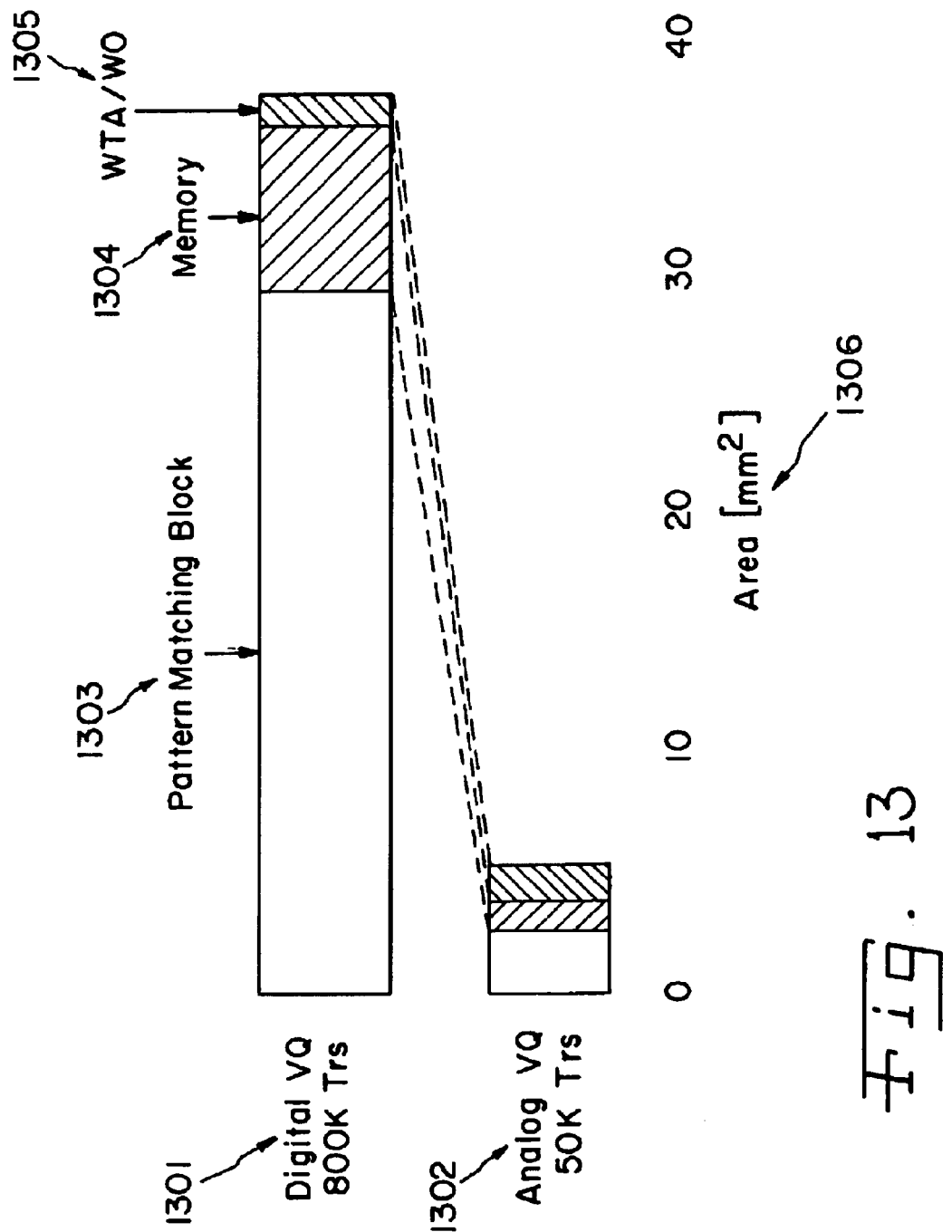
FIG. 13 shows a comparison of areas of a digital and analog VQ chip.

FIG. 12 shows a photograph of the analog VQ chip produced according to the embodiment. The chip size is 7.2 mm×7.2 mm, and accommodated in a SQFP package. The matching circuit for a 256 code book vectors was layouted with the package divided to fifty-fifty above and below. The layout is constituted such that the WTA circuit and the WO circuit are arranged at the center and the difference absolute value distance signals are outputted toward the center of the chip. Differences of the delay times were considered to be restrained to the utmost by configuring the wiring to deliver the reference signal to the 256 neuron-MOS comparators with the H-Tree method. FIG. 13 shows a result of comparing the circuit area of the chip produced according to the embodiment to that of a digital VQ processor for each element block. The digital VQ processor was produced under the design rule of 0.6 micrometers, so that the comparison of the circuit areas was performed by converting the area of the analog VQ processor to micrometers. As a result of the comparison, it is understood that the area reduction of approximately 85% is achieved in the analog VQ processor. This is because the circuit scale of the difference absolute value circuit which accounts for a large percentage of the circuit was reduced to a large degree by using the analog multivalue circuit. From this result, it is considered that a VQ processor corresponding to 2048 code book vectors can be sufficiently realized with one chip by using the analog multivalue method according to the present embodiment under the 0.6 micrometers design rule.

Figure 14:
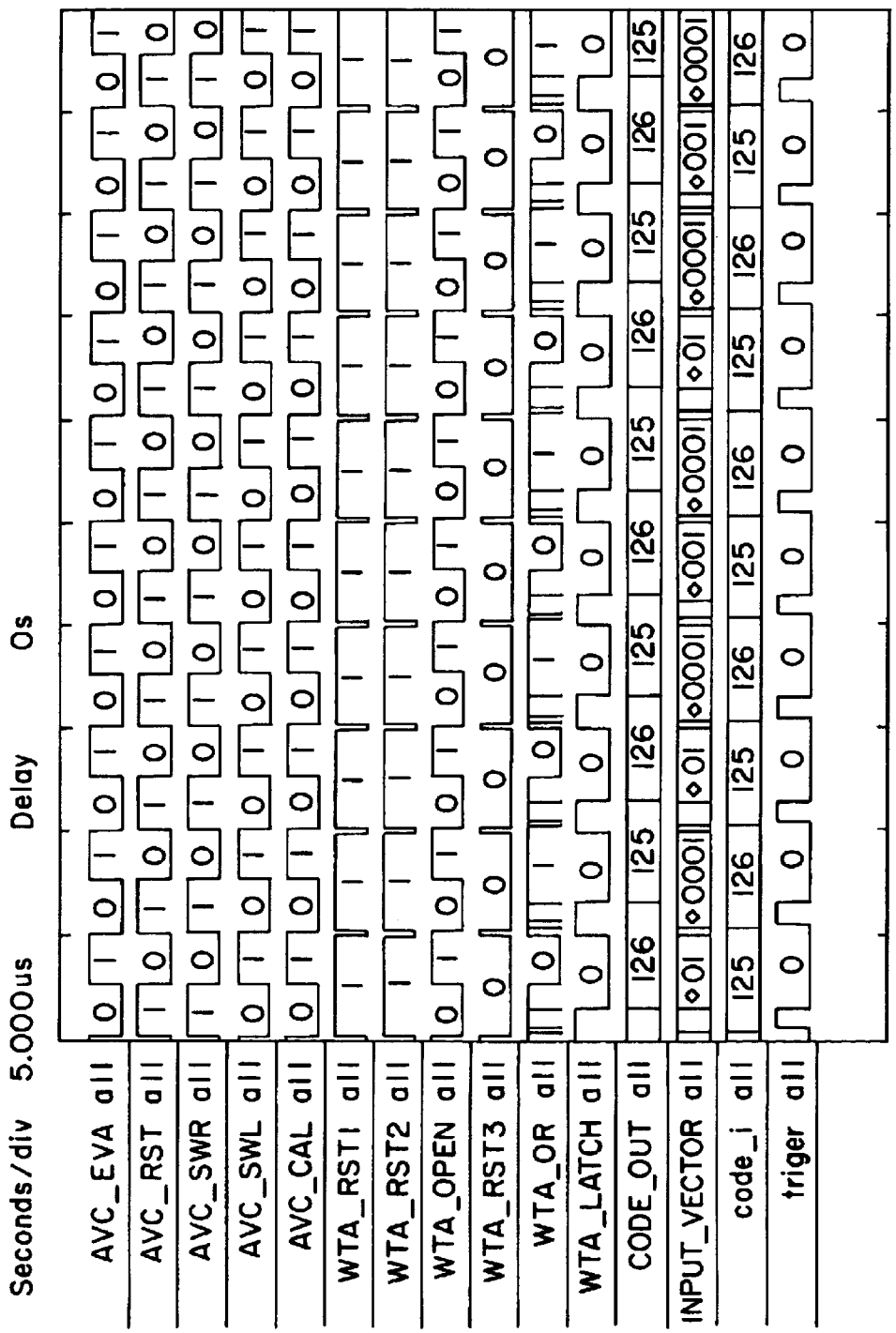
FIG. 14 shows entire operating waveforms of the prototype chip measured using a logic analyzer.

FIG. 14 shows a result of measuring the entire operating waveforms of the chip using a logic analyzer. This measurement was performed by alternately inputting the same code book vectors as those of the 125-th and 126-th in the chip. In the chip production according to the embodiment, it was designed that five control signals were inputted to the vector, matching block and four were inputted to the WTA block from the outside. This was performed in order to avoid a problem occurred from a timing shift of the control signals in the analog circuit. The controlling of the chip is done to execute the pipe line operation as described above. Although operating speed with the cycle of 5 microseconds is late, the desired values have been outputted.

Figure 15:
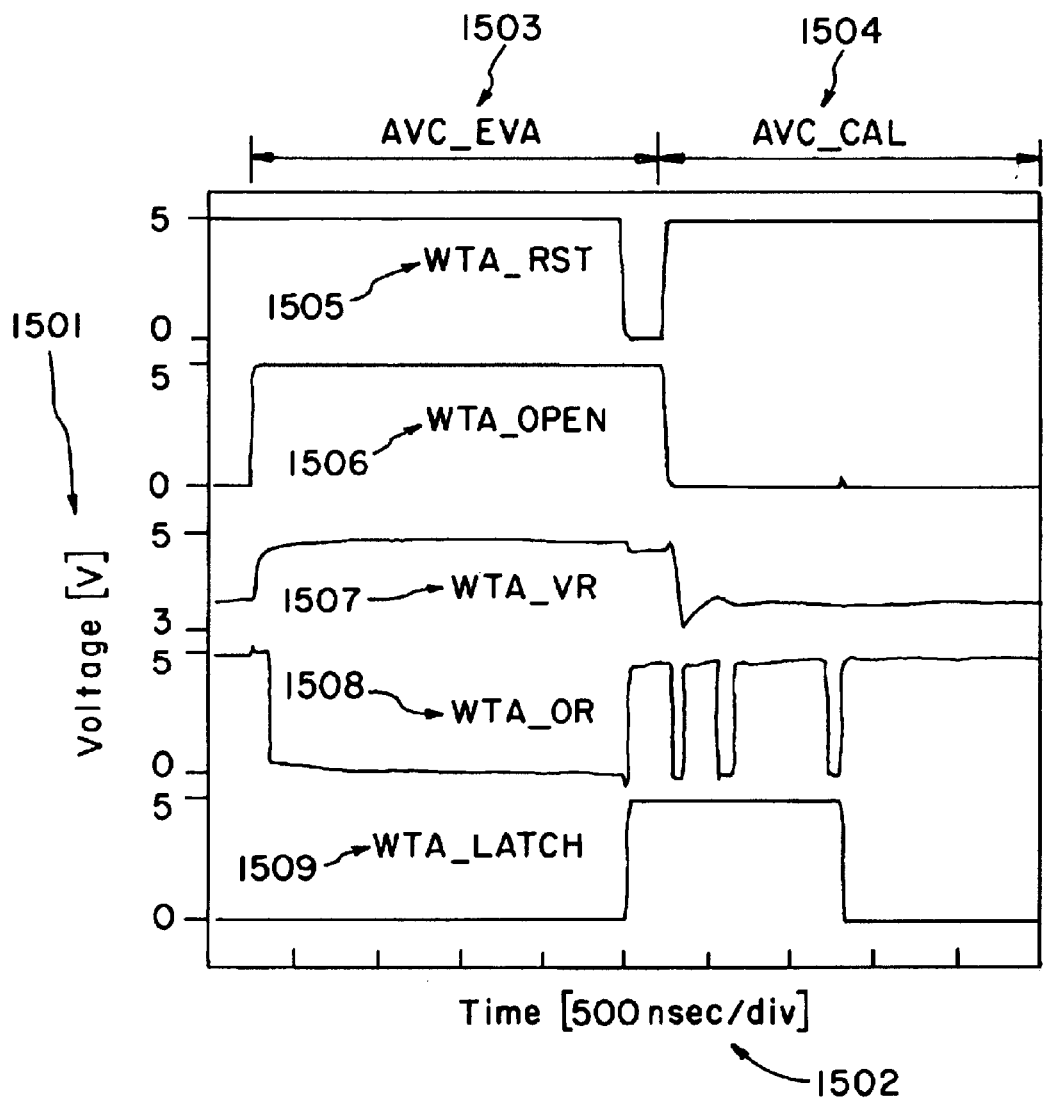
FIG. 15 shows operating waveforms of the WTA block measured using an oscilloscope.

FIG. 15 shows a result of measuring the operating waveforms of the WTA block using an oscilloscope. Signals of the first and second stage are a control signal for resetting the neuron-MOS comparators and a feedback control signal of the neuron-MOS ring oscillator, respectively. The waveform of the third stage is a result of observing the appearance of changes of the reference voltage signal through an operational amplifier with a voltage follower. In addition, the waveforms of the fourth and fifth stage are obtained by a result of observing the output waveform of the OR gate and the output of the latch signal, respectively.

The five stages self-converging operation of the reference voltage was confirmed similarly to the simulation waveforms, so that the switching sequence of the variable resistor was ascertained to operate normally. Further, a conspicuous result was obtained such that, when compared to the result in the simulation, period of logic 0 of the output waveform of the OR gate became shorter than period of logic 1. This is because the control of the sweep speed using the RC time constant has a nature of the larger the voltage amplitude to be changed the faster the speed thereof. That is, it is considered that, because the maximum threshold value of the neuron-MOS comparator is shifted to the $V_{dd}$ side in the present embodiment, a speed of discharging toward 0V is tend to be faster than that of charging to 5V.

In the present design, the simulation and design were performed for the target in which the search times in WTA were settled within 500 nanoseconds for the maximum threshold value voltage of all the comparators. However, in actual, approximately one microsecond was required until the latch was actuated. The cause could not be made clear, however, it was supposed that the influence of the parasitic capacity of the reference voltage signal lines which could not be fully extracted in the circuit design of the actually produced circuit was yet present, or the feedback delay time was actually different from the simulation result. However, even if such result was obtained, when the same operation was executed by the ramp scan method, the sweep speed must be set up less than 0.5V/microseconds in order to obtain the accuracy of 5 mV under the circuit delay of 10 nanoseconds. And, when the sweep of 1.5V is performed under this condition, the search time of approximately 3 microseconds is essentially required. When compared to the ramp scan method, it will be understood that the reference signal self-converging method according to the present embodiment unexpectedly makes sure of superiority in speed of about three times.

Figure 16:
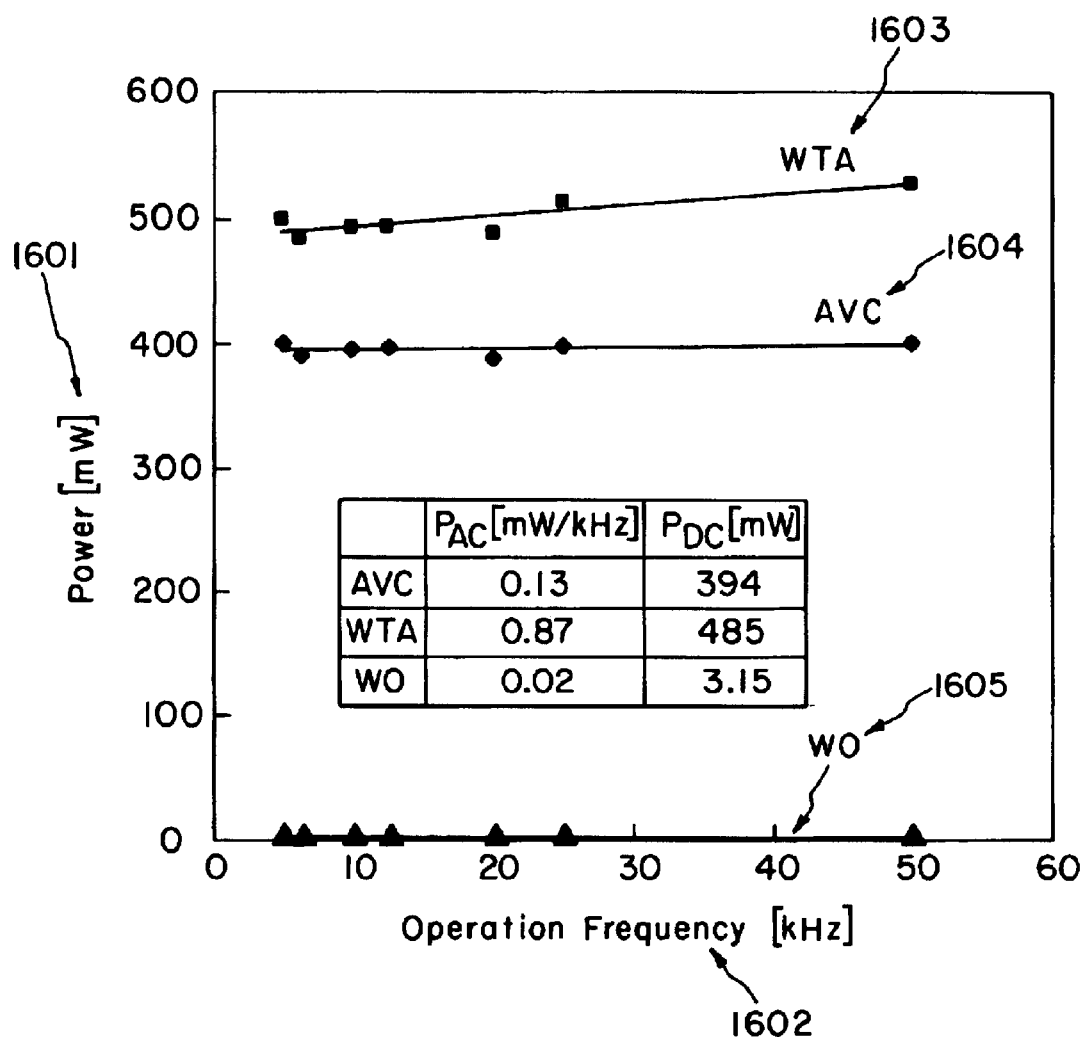
FIG. 16 shows results of power consumption measurements while each block is operating.

FIG. 16 shows a result of separately measuring amounts of power consumption of the respective vector matching block (AVC), WTA block, and WO block when the chip is in operation for their operating frequencies. Here, one cycle deciding the frequency was defined by one pipe line cycle of the AVQ processor. On the whole, the ingredients of direct current power consumption occupied the great portion of the amount of the power consumption, and the total power consumption was a little less than 1W.

Embodiment 2

The second embodiment according to the present invention will be explained using a circuit diagram of FIG. 17.

Figure 17:
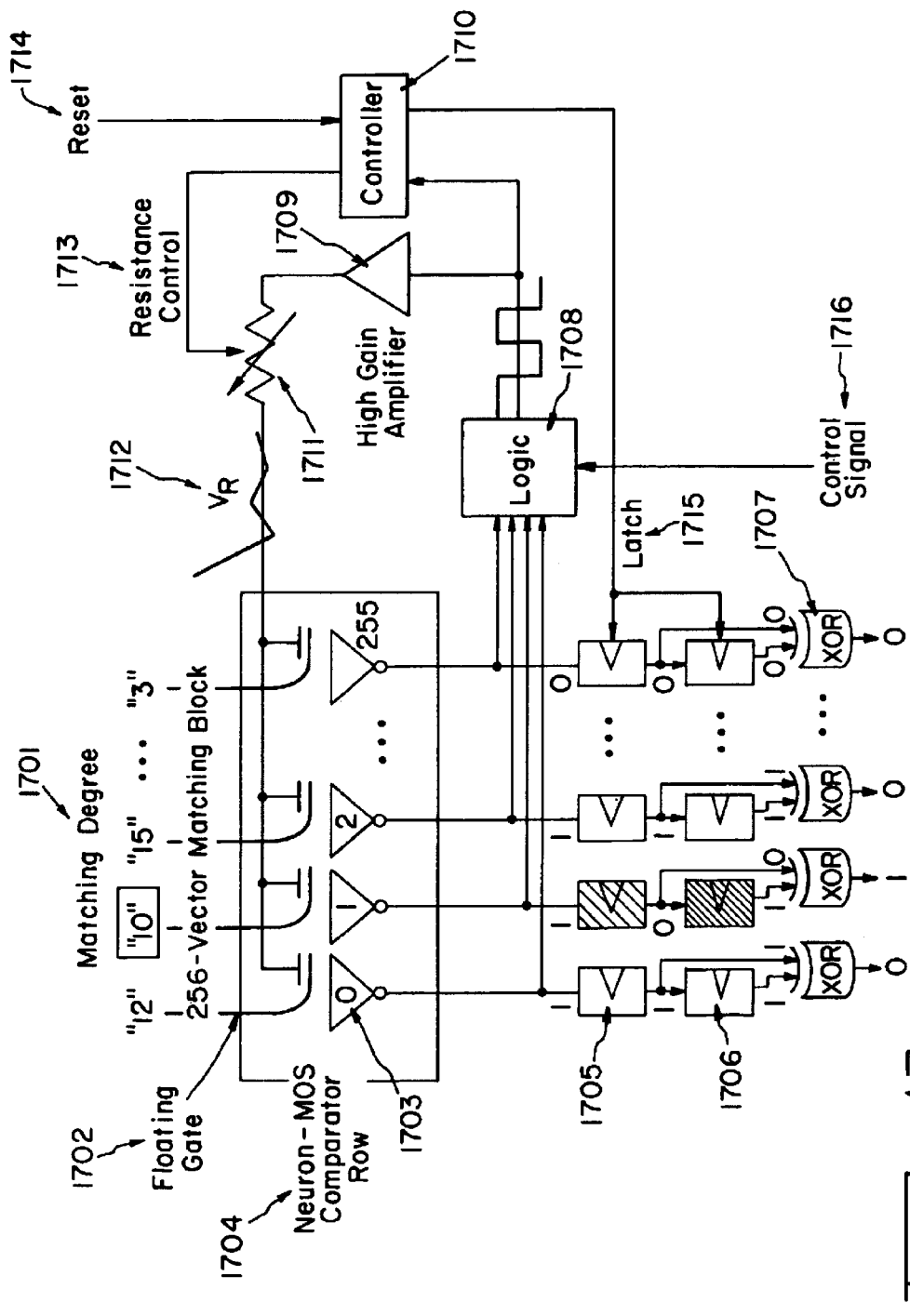
FIG. 17 shows a circuit of a second embodiment of the present invention.
Figure 18:
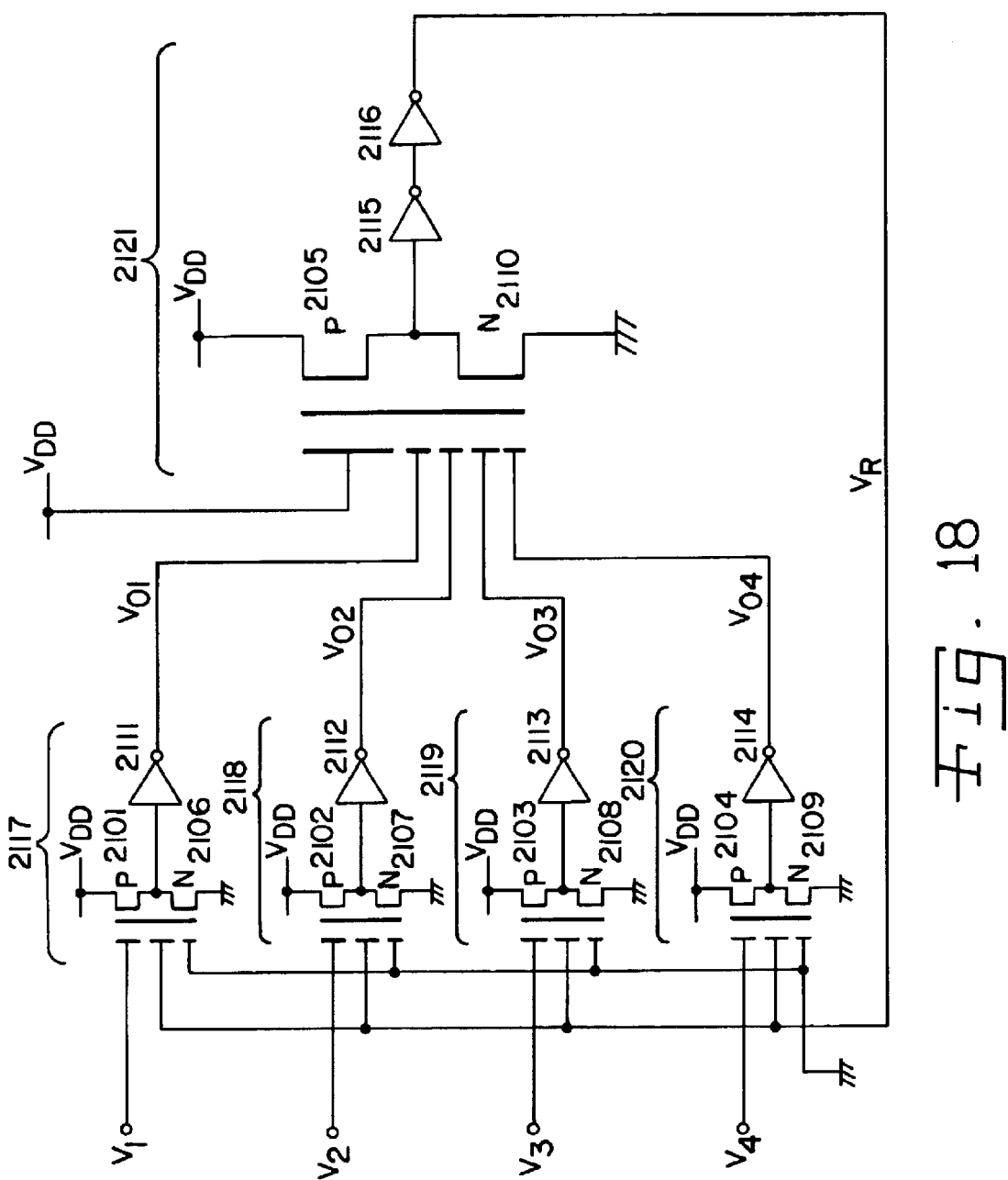
FIG. 18 shows a circuit of a conventional of the prior art.

FIG. 17 is constituted such that the OR gate in the circuit diagram of FIG. 6 is substituted for a logical circuit 1708, latch circuits 1705, 1706 are connected in series in two steps as storage circuits, each of outputs of the latch circuits is inputted to an exclusive OR gate 1707, and the search result for predetermined vectors is obtained from the output of the exclusive OR gate 1707.

In this embodiment, the logical circuit 1708 is shown as an example of such a circuit that outputs logic 1 when more than two outputs from respective comparators become logic 1. Therefore, according to the operation similar to that of Embodiment 1, finally, in this circuit, only the comparator to which the third largest distance among inputted distances is inputted periodically and repeatedly outputs logic 1 and logic 0.

The logical circuit 1708 can be realized using a known circuit technique. For example, it is well known that this circuit can also be constituted using neuron-MOS transistors which can readily realize a variable threshold value operation for multi-input. This circuit can also be put into practice using other digital logical circuits.

In the present embodiment, as the latch circuits 1705, 1706 are connected in series, when the retrieval operation due to the switching of the variable resistor reaches final stage, two outputs of each comparator and the preceding stage can be stored by a latch signal 1715. Accordingly, the position of the comparator which repeatedly changes its output even in the final stage can be identified by inputting each of the output values of the latch circuits to the exclusive OR gate and by comparing their differences. This allows the third largest distance to be retrieved.

The present embodiment is still one example of the invention, and it will be appreciated that any order of the distance to be retrieved, such as fourth, tenth, or other order, can readily be realized by employing the similar configuration. In particular, if a variable threshold value element such as a neuron-MOS transistor is used, setting of number of logic 1 in the logical circuit 1708 can be readily changed by a control input electrode, so that the configuration for arbitrarily changing this order by an external electrical control signal 1716 can be realized without difficulty. Further, it will be appreciated that a logical gate in which setting of number of logic 1 can be changed by an external signal can be realized using other known technique without sticking to the neuron-MOS transistor. In addition, it will be appreciated that the storage circuit in the present embodiment may be substituted for any other circuit with the similar function.

According to the present invention, a semiconductor arithmetic unit can be realized which achieves a maximum or minimum value retrieval operation at high speed and with a high degree of accuracy used in a vector quantization processor composed of a binary-multivalue-analog merged operation processing circuit. In addition, a function for retrieving a vector with a distance of necessary order can be added to the unit.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A semiconductor signal processor unit having a multi-loop circuit comprising:
   an amplifying circuit group composed of a plurality of sets of first amplifiers with a floating gate to which at least one first electrode and a single second electrode are capacitively coupled with a predetermined ratio;
   a logical operation circuit to which output signals of said amplifying circuit group are inputted and which outputs a logical 0 or 1; and
   a second amplifying circuit to which an output signal of said logical operation circuit is inputted and whose output is distributed to all of said second electrodes of the amplifying circuit group, such that said second amplifying circuit includes an adjusting circuit which adjusts an output current driving ability and a controlling circuit which controls said adjustment with a predetermined regulation, and said adjustment of said controlling circuit is executed according to variation of said output of said logical operation circuit.

2. The semiconductor arithmetic unit according to claim 1, wherein said floating gate is connected to a predetermined voltage terminal through a switch controlled by a first control signal.

3. The semiconductor arithmetic unit according to claim 2, wherein charges are accumulated on said floating gate by setting up said first control signal with a predetermined method.

4. The semiconductor arithmetic unit according to claim 3, wherein said second electrode is connected to a predetermined voltage terminal and an output terminal of said second amplifying circuit through a switch controlled by a third control signal.

5. The semiconductor arithmetic unit according to claim 2, wherein said second electrode is connected to a predetermined voltage terminal and an output terminal of said second amplifying circuit through a switch controlled by a third control signal.

6. The semiconductor arithmetic unit according to claim 5, wherein charges are accumulated on said floating gate by setting up said first, second, and third control signal with a predetermined method.

7. The semiconductor arithmetic unit according to claim 2, wherein said first electrode is connected to a predetermined voltage terminal and a signal terminal receiving an arbitrary voltage value through a switch controlled by a second control signal.

8. The semiconductor arithmetic unit according to claim 1, wherein said first electrode is connected to a predetermined voltage terminal and a signal terminal receiving an arbitrary voltage value through a switch controlled by a second control signal.

9. The semiconductor arithmetic unit according to claim 8, wherein said second electrode is connected to a predetermined voltage terminal and an output terminal of said second amplifying circuit through a switch controlled by a third control signal.

10. The semiconductor arithmetic unit according to claim 1, wherein said logical operation circuit is composed of a circuit which outputs a logic 1 when a number of logical 1 among all of outputs of said inverting amplifying circuit group becomes equal to or more than a predetermined number.

11. The semiconductor arithmetic unit according to claim 1, wherein said logical operation circuit is composed of a circuit which outputs a logic 1 when a number of logical 1 among all of outputs of said inverting amplifying circuit group becomes equal to or more than a predetermined number, and further, said predetermined number of logical 1 can be appropriately changed by an external control signal.

12. The semiconductor arithmetic unit according to claim 1, wherein said logical operation circuit is composed of an AND or OR circuit.

13. The semiconductor arithmetic unit according to claim 1, wherein said adjusting circuit is realized using a variable resistor.

14. The semiconductor arithmetic unit according to claim 13, wherein said variable resistor is realized using a MOS FET.

15. The semiconductor arithmetic unit according to claim 13, wherein said variable resistor is realized by connecting in parallel a plurality of MOS FETs with a variety of electric current driving abilities.

16. The semiconductor arithmetic unit according to claim 1, wherein adjusting times and an adjusting amount per one time of said adjusting circuit are optimized in design so as to make converging times shortest using a loop delay time of said multi-loop oscillation circuit, the power supply voltage, a precision prescribed, and a predicted voltage value of said signal terminal.

17. The semiconductor arithmetic unit according to claim 1, wherein a ratio of sum of capacity values when said first electrodes are connected to said floating gate to a capacity value when said second electrode is connected to said floating gate is 1:1.

18. The semiconductor arithmetic unit according to claim 1, further comprising a storage circuit to store output signals of said amplifying circuit group using a fourth control signal and to read out their stored values.

19. The semiconductor arithmetic unit according to claim 18, wherein said storage circuit comprises a circuit which stores output values of said amplifying circuit group of the final stage in the adjusting times of said electric current driving ability of said logical operating circuit and of the preceding stage, and detects only the changed values in said respective output values.

20. The semiconductor arithmetic unit according to claim 18, wherein said storage circuit comprises a circuit which stores output values of said amplifying circuit group of the only final stage in the adjusting times of said electric current driving ability of said logical operating circuit.

* * * * *